(12) United States Patent
Fujita

(10) Patent No.: US 8,547,054 B2
(45) Date of Patent: Oct. 1, 2013

(54) POWER SUPPLY APPARATUS

(75) Inventor: Goro Fujita, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1132 days.

(21) Appl. No.: 12/071,839

(22) Filed: Feb. 27, 2008

(65) Prior Publication Data
US 2008/0203816 A1 Aug. 28, 2008

(30) Foreign Application Priority Data

Feb. 28, 2007 (JP) ................................ 2007-050771

(51) Int. Cl.
*H02J 7/00* (2006.01)

(52) U.S. Cl.
USPC .......................................... 320/101

(58) Field of Classification Search
USPC .......................................... 320/101
See application file for complete search history.

(56) References Cited

U.S. PATENT DOCUMENTS

| | | | | |
|---|---|---|---|---|
| 4,056,764 A * | 11/1977 | Endo et al. | | 320/101 |
| 6,255,008 B1 * | 7/2001 | Iwase | | 429/9 |
| 6,573,682 B1 * | 6/2003 | Pearson | | 320/101 |
| 7,117,044 B2 * | 10/2006 | Kocher et al. | | 700/34 |
| 7,318,971 B2 * | 1/2008 | Imamura et al. | | 429/431 |
| 7,521,890 B2 * | 4/2009 | Lee et al. | | 320/108 |
| 7,771,856 B2 * | 8/2010 | Yoshida et al. | | 429/432 |
| 7,816,812 B2 * | 10/2010 | Nakashima et al. | | 307/44 |
| 7,839,018 B2 * | 11/2010 | Chen et al. | | 307/46 |
| 2003/0180592 A1 * | 9/2003 | Ueda et al. | | 429/30 |
| 2004/0166387 A1 * | 8/2004 | Imamura et al. | | 429/22 |
| 2005/0206342 A1 * | 9/2005 | Aleyraz et al. | | 320/101 |
| 2006/0029844 A1 * | 2/2006 | Kobayashi et al. | | 429/23 |
| 2006/0029846 A1 * | 2/2006 | Konoto et al. | | 429/23 |
| 2006/0197382 A1 * | 9/2006 | Chou et al. | | 307/48 |
| 2007/0231630 A1 * | 10/2007 | Yoshii | | 429/13 |
| 2009/0233127 A1 * | 9/2009 | Ohya et al. | | 429/13 |
| 2010/0316922 A1 * | 12/2010 | Hamada et al. | | 429/432 |

FOREIGN PATENT DOCUMENTS

| | | |
|---|---|---|
| JP | 2004-319367 | 11/2004 |
| JP | 2005-033946 | 2/2005 |
| JP | 2006-310246 | 11/2006 |
| JP | 2007-037371 | 2/2007 |

OTHER PUBLICATIONS

Japanese Notification of Reason(s) for Refusal, w/ English translation thereof, issued in Japanese Patent Application No. JP 2007-050771 dated Jan. 11, 2011.

Japanese Office Action, and English translation thereof, issued in Japanese Patent Application No. 2007-050771 dated Nov. 29, 2011.

* cited by examiner

*Primary Examiner* — Drew A Dunn
*Assistant Examiner* — Robert Grant
(74) *Attorney, Agent, or Firm* — McDermott Will & Emery LLP

(57) ABSTRACT

Provided is a technology where a voltage capable of driving a mobile device, to which a power supply apparatus is connected, is automatically detected. The power supply apparatus, for supplying power to the device connected, includes a power supply, a voltage conversion unit which varies a voltage inputted from the power supply to a predetermined voltage and outputs the varied voltage to the device, an ammeter which measures an output current value of the power supply apparatus, and a control unit which controls the voltage varied by the voltage conversion unit. The control unit boosts the voltage outputted from the power supply in stages and detects, by detecting a change in the output current value, that the output voltage of the power supply apparatus boosted by the voltage conversion unit has reached a voltage capable of driving the device.

7 Claims, 23 Drawing Sheets

POWER SUPPLY APPARATUS

CROSS-REFERENCE TO RELATED APPLICATIONS

This application is based upon and claims the benefit of priority from the prior Japanese Patent Application No. 2007-050771, filed on Feb. 28, 2007, the entire contents of which are incorporated herein by reference.

BACKGROUND OF THE INVENTION

1. Field of the Invention

The present invention relates to a power supply apparatus and, more particularly, to a power supply apparatus using a fuel cell as power source.

2. Description of the Related Art

Along with the advancement of information society, the number of people using mobile devices is increasing. In many cases, power supply voltage required by such mobile devices differ for each device. When the mobile device is connected with an external power source, the voltage of the external power source needs to be adjusted to that capable of driving the device. A technique is proposed where a voltage instructing device is so provided between the external power source and the mobile device that the voltage is easily adjusted. Information on the voltage capable of driving the corresponding mobile device is stored beforehand in this voltage instructing device. The voltage instructing device sends this information to the external power source. Thereby, the external power source can detect the voltage required by the mobile device and adjust an output voltage therefor.

However, when this technique using the voltage instructing device is implemented, a plurality of corresponding voltage instructing devices need to be prepared for the mobile devices, respectively. This may not be convenient for users. Also, where a fuel cell is used as the external power source, variation in output power makes it difficult to operate the mobile devices stably.

SUMMARY OF THE INVENTION

The present invention has been made in view of the foregoing problems, and a general purpose thereof is to provide a technique where a power supply apparatus itself automatically detects a voltage capable of driving a mobile device connected thereto. An advantage of the present invention is to provide a technique to facilitate the stable operation of the mobile device connected thereto when a fuel cell is used as an external power source.

One embodiment of the present invention relates to a power supply apparatus for supplying power to a device connected thereto. The apparatus comprises: a power supply; a voltage conversion unit which varies a voltage inputted from the power supply to a predetermined voltage and outputs the varied voltage to the device; an ammeter which measures an output current value of the power supply apparatus; and a control unit which controls variation in voltage caused by the voltage conversion unit, wherein the control unit boosts the voltage outputted from the power supply in stages and detects, by detecting a change in the output current value, that the output voltage of the power supply apparatus boosted by the voltage conversion unit has reached a voltage capable of driving the device.

By employing the power supply apparatus according to the above embodiment, the voltage capable of driving the device connected thereto is automatically detected, so that the power supply apparatus can be more easily used as a general-purpose power source which can easily supply electric power to various types of devices. A user doesn't need to be conscious of the voltage capable of a device to be connected.

In the power supply apparatus according to the above-described embodiment, after detecting that the output voltage has reached the voltage capable of driving the device, the control unit may detect a lower limit of the voltage capable of driving the device in a manner such that the boosted voltage is gradually decreased and the change in the output current value is detected.

By employing the power supply apparatus according to the above-described embodiment, the lower limit of the voltage capable of deriving the device connected thereto can be automatically detected. Since the lower limit of the voltage capable of driving the device can be found out, the device connected thereto can be stably operated if the voltage is adjusted within a range determined by the voltage capable of driving the device detected by boosting the voltage and the lower limit thereof detected by decreasing the voltage.

In the power supply apparatus according to the above-described embodiment, the control unit transmits information on the power supply apparatus to the device in a manner that the voltage conversion unit varies an output voltage of the power supply apparatus within a range of the detected voltage capable of driving the device and the detected lower limit of the voltage capable of driving the device.

By employing the power supply apparatus according to the above-described embodiment, the voltage is varied within a range of the voltage capable of driving the device connected thereto, so that the information can be sent to the device while the device remains in operation. Also, the information is transmitted through a change in voltage, thus eliminating the provision of additional wiring or equipment necessary for the transmission of the information.

The power supply apparatus according to the above-described embodiment may further comprise: a secondary battery; a charge-discharge unit which outputs electric power from the secondary battery or charges the secondary battery by use of electric power of the power supply; and a voltmeter which measures an input voltage value to the voltage conversion unit from the secondary battery, wherein the control unit may compare the input voltage value with a predetermined voltage value, wherein when the input voltage value is less than the predetermined voltage value, it may be determined that an output power value of the power supply apparatus is insufficient to satisfy a power required by the device, and wherein when the input voltage value is greater than the predetermined voltage value, it may be determined that the output power value of the power supply apparatus is sufficient to satisfy the power required by the device, and the secondary battery may be charged by the electric power of the power supply by controlling the charge-discharge unit.

By employing the power supply apparatus according to the above-described power supply apparatus, the output power from the secondary battery is used to refill the power source so as to keep the steady output of the power source. Thus, the power supply apparatus facilitates the stable supply of the electric power to the device connected to the power supply apparatus. Also, the secondary battery is automatically recharged by using the output power from the power source, so that the convenience of users is high.

The power supply apparatus according to the above-described embodiment may further comprise a second voltmeter which measures an output voltage value of the power supply apparatus, wherein the control unit may compare the input voltage value in the second voltmeter with a predetermined voltage value; and when a transition is made from a state where the input voltage value is above the predetermined voltage value to a state where the input voltage value is below the predetermined value, the control unit may calculates an output power value of said power supply apparatus by referring to the then output voltage value of the ammeter and the then output voltage value of the second voltmeter.

By employing the power supply apparatus according to the above-described power supply apparatus, a power value in an actual usage environment can be used as an upper-limit target of the output power of the power supply apparatus, so that the acquisition of more accurate upper limit of the output power is facilitated.

The power supply apparatus according to the above-described embodiment may further comprise: a second ammeter which measures an output current value of the secondary battery; and a second voltmeter which measures an output voltage value of the power supply apparatus, wherein the control unit may compare the output current value in the second ammeter with a predetermined current value; and when a transition is made from a state where the output current value is below the predetermined current value to a state where the output current value is above the predetermined value, the control unit may calculate the output voltage of the power supply apparatus by referring to the then output current value of the ammeter and the then output voltage value of the second voltmeter.

By employing the power supply apparatus according to the above-described power supply apparatus, the power value in the actual usage environment can be used as an upper-limit target of the output power of the power supply apparatus. This facilitates the acquisition of more accurate upper limit of the output power.

The control unit transmits the calculated output power value to the device in a manner such that the calculated output power is converted into a value of cycle, by which to vary the output voltage, by use of a predetermined function and the output voltage of the power supply apparatus is varied by using the value of cycle.

By employing the power supply apparatus according to the above-described embodiment, the value of the calculated output power can be sent as the cycle of voltage variation, it can be sent easily in the power supply apparatus side and the received information can be easily acquired in the device side.

In the power supply apparatus according to the above-described power supply apparatus, the power supply may be a fuel cell.

By employing the power supply apparatus according to the above-described embodiment, even though the power supply, such as a fuel cell, where the output power varies is used, a user can use the device comfortably.

It is to be noted that any arbitrary combinations or rearrangement of the aforementioned structural components and so forth are all effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
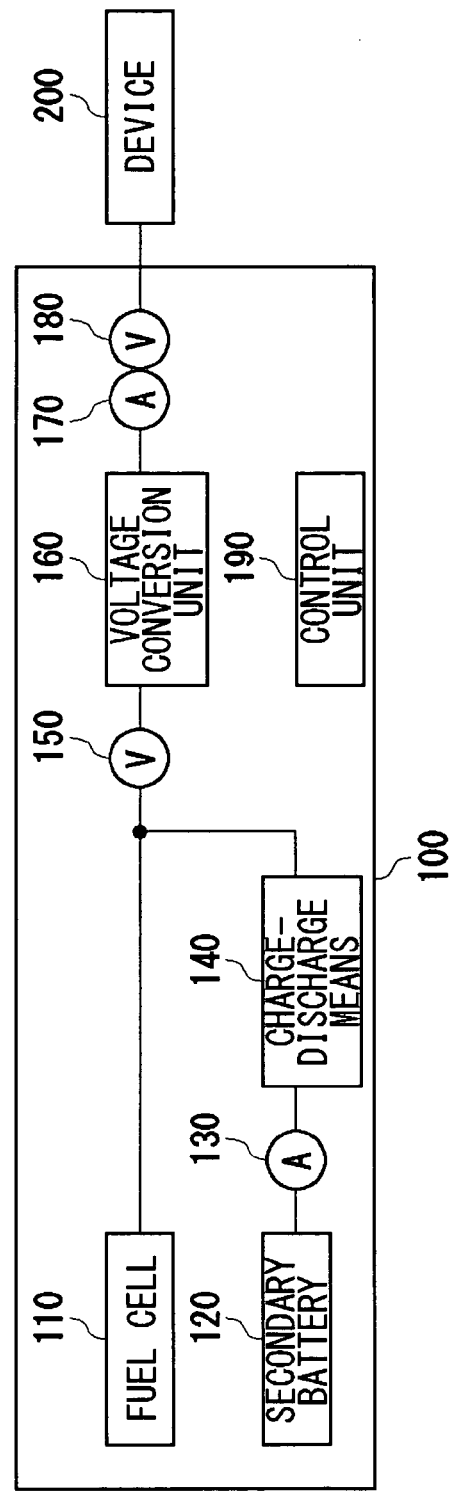
FIG. 1 schematically shows a structure of a power supply apparatus according to an embodiment of the present invention.

FIG. 1 schematically shows a structure of a power supply apparatus 100 according to an embodiment of the present invention. The power supply apparatus 100 includes a fuel cell 110, a secondary battery 120, an ammeter 130, a charge-discharge unit 140, a voltmeter 150, a voltage conversion unit 160, an ammeter 170, a voltmeter 180, and a control unit 190. The power supply apparatus 100 supplies electric power to a device 200 connected thereto. The device 200 may be a notebook personal computer, a mobile phone, a PDA or the like. However, it may be other than those as long as it can use the electric power supplied from the power supply apparatus 100.

As a main power supply of the power supply apparatus 100, the fuel cell 110 outputs the electric power to the device 200 which is connected to the power supply apparatus 100. The secondary battery 120 is connected to the charge-discharge unit 140 by way of the ammeter 130. Where an output power of the fuel cell 110 is insufficient for the power required by the device 200, the electric power of the second cell 120 is used to refill it, so that the device 200 can be operated stably. The ammeter 130 measures the value of current which is outputted from the secondary battery 120 and is inputted to the charge-discharge unit 140. The measured current value is sent to the control unit 190.

When the output power of the fuel cell 110 is insufficient for the power required by the device 200, the charge-discharge unit 140 switches the mode to the discharge mode in response to an instruction from the control unit 190 and uses the power of the secondary battery 120 to supplement the output power. Conversely, when the output power of the fuel cell 110 exceeds the power required by the device 200, the charge-discharge unit 140 switches the mode to the charge mode in response to an instruction from the control unit 190 and uses the power of the fuel cell to charge the secondary battery 120.

After having switched the mode to the discharge mode, the charge-discharge unit 140 boosts the output power of the secondary battery 120 so as to be outputted. After having switched the mode to the charge mode, the charge-discharge unit 140 decreases the output voltage from the fuel cell 110 so as to be outputted to the secondary battery 120.

Figure 2:
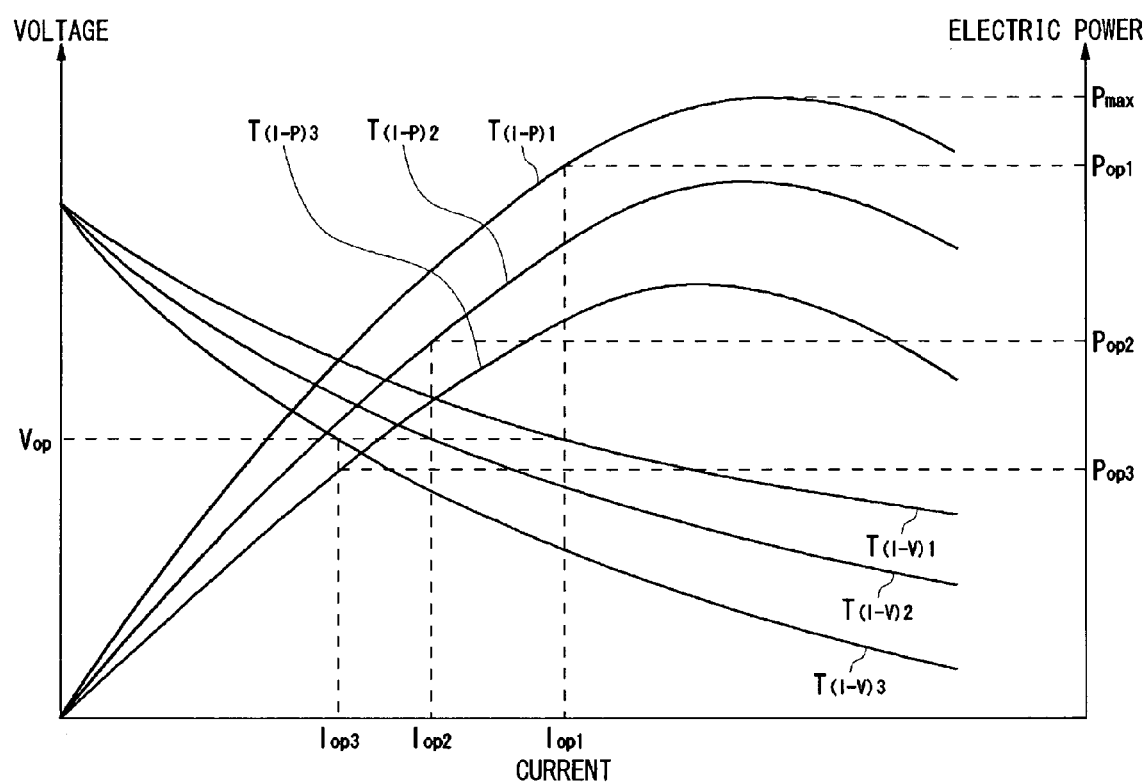
FIG. 2 shows a current-power characteristic and a current-voltage characteristic of a fuel cell.

A description is next given of how the control unit 190 determines if the output power of the fuel cell 110 is insufficient to deliver the power required by the device 200 or it exceeds the power required by the device 200. FIG. 2 shows a current-power characteristic $T_{I\text{-}P}$ and a current-voltage characteristic $T_{I\text{-}V}$ of the fuel cell 110 according to the present embodiment. $T_{(I\text{-}P)1}$ indicates the current-power characteristic of the fuel cell 110 which is operating stably. $T_{(I\text{-}P)2}$ indicates the current-power characteristic where the output of the fuel cell 110 drops temporarily at the time of start or the like. $T_{(I\text{-}P)3}$ indicates the current-power characteristic of the fuel cell 110 where it has been used for a long period of time and the output performance deteriorates. $T_{(I\text{-}V)1}$ corresponds to $T_{(I\text{-}P)1}$ and indicates the current-voltage characteristic where the fuel cell 110 operates stably. Similarly, $T_{(I\text{-}V)2}$ and $T_{(I\text{-}V)3}$ are current-voltage characteristics corresponding to $T_{(I\text{-}P)2}$ and $T_{(I\text{-}P)3}$, respectively.

A description is now given of a state where the fuel cell 110 operates stably. Firstly, the value of $P_{max}$ where the output voltage becomes maximum on $T_{(I\text{-}P)1}$. Then the value of an output power $P_{OP1}$ which is slightly lower than the value of $P_{max}$ is determined so that the fuel cell 110 can operate safely. For example, the value equivalent to 80% of $P_{max}$ may be used as $P_{OP1}$ or the optimum value may be obtained through experiments. It is evident that the output current with the output power at $P_{OP1}$ is $I_{OP1}$ from $T_{(I\text{-}P)1}$ and the output voltage with the output power at $P_{OP1}$ is $V_{OP}$ from $T_{(I\text{-}V)1}$.

If the power required by the fuel cell 110 is larger than $P_{OP1}$ the output current of the fuel cell 110 will be larger than $I_{OP1}$ (refer to the current-power characteristic $T_{(I\text{-}P)1}$) and, as a result, the output voltage will be lower than $V_{OP}$ (see the current-voltage characteristic $T_{(I\text{-}V)}$). In other words, if the output voltage becomes lower than $V_{OP}$, the output power will be larger than the $P_{OP1}$ so that there is a probability that the fuel cell 110 will not operate stably. Accordingly, when the output voltage of the fuel cell 110 becomes lower than $V_{OP}$, it is determined that the output power of the fuel cell 110 is insufficient to deliver the power required by the device. Conversely, when the output voltage of the fuel cell 110 becomes higher than $V_{OP}$, it is determined that the output power of the fuel cell 110 exceeds the required power.

Even if the output of the fuel cell 110 drops temporarily, whether the output power is insufficient or in excess can be determined based on the value of $V_{OP}$. If the required power is larger than $P_{OP2}$, the output current will be larger than $I_{OP2}$ (see the current-power characteristic $T_{(I\text{-}P)2}$) and the output voltage will be lower than $V_{OP}$ (see the current-voltage characteristic $T_{(I\text{-}V)2}$). When the output voltage becomes lower than $V_{OP}$, it is determined that the output power is insufficient; and when the output voltage becomes higher than $V_{OP}$, it is determined that the output power is in excess. Even when the output performance of the fuel cell 110 deteriorates, whether the output power is insufficient or in excess is similarly determined based on the value of $V_{OP}$. This is because the output power of the fuel cell 110 which is operating stably serves as the basis for the decision and thereby the maximum output performance of the fuel cell 110 can be achieved.

The voltage value corresponding to $V_{OP}$ of the fuel cell 110 is acquired beforehand, and $V_{OP}$ is stored in the control unit 190. The voltmeter 150 measures the output voltage of the fuel cell 110. The control unit 190 compares the voltage value sent from the voltmeter 150 with the voltage value corresponding to $V_{OP}$, and the control unit 190 thereby determines whether the output power of the fuel cell 110 is insufficient for or in excess of the power required by the device 200.

Figure 3:
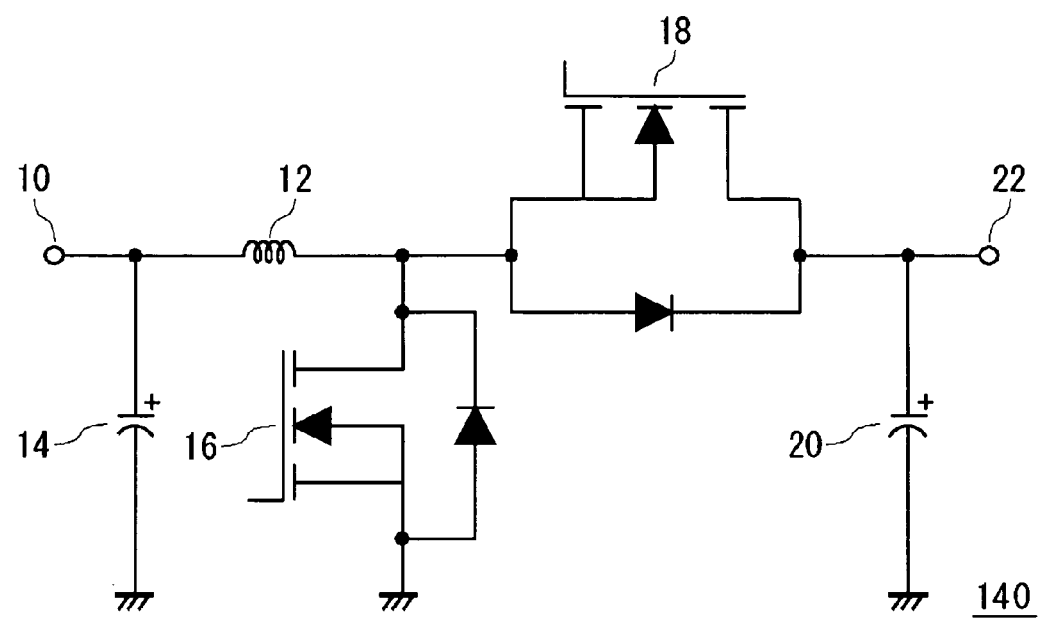
FIG. 3 shows an exemplary structure of a charge-discharge unit.

FIG. 3 shows an exemplary structure of the charge-discharge unit 140. The charge-discharge unit 140 includes a terminal 10 connected to the secondary battery 120 (not shown in FIG. 3), a coil 12, a capacitor 14, a switching element for discharging 16, a switching element for charging 18, a capacitor 20, and a terminal 22 connected to the fuel cell 110 (not shown in FIG. 3) and the voltage conversion unit 160 (not shown in FIG. 3).

The discharging switching element 16 includes a MOSFET (insulated gate field effect transistor) and a diode whose coil 12 side is a cathode. The charging switching element 18 includes a MOSFET and a diode whose coil 12 side is an anode. The terminal 10 is connected to one end of the coil 12 and one end of the capacitor 14. The other end of the coil 12 is connected to one end of the discharging switching element 16 and one end of charging switching element 18.

The other end of the capacitor 14 and the other end of the discharging switching element 16 have the same potential as the negative electrodes of the secondary battery 120 and the fuel cell 110. The other end of the charging switching element 18 is connected to one end of the capacitor 20 and the terminal 22, whereas the other end of the capacitor 20 has the same potential as the negative electrodes of the secondary battery 120 and the fuel cell 110.

At the discharging mode, the MOSFET that constitutes the discharging switching element 16 is turned on and the MOSFET that constitutes the charging switching element 18 is turned off, so that energy is stored in the coil 12 by the output voltage of the secondary battery 120 (not shown in FIG. 3). Thereafter, when the MOSFET that constitutes the discharging switching element 16 is switched to OFF and at the same time the MOSFET that constitutes the charging switching element 18 is switched to ON, the energy stored in the coil 12 is stabilized by the capacitor 20 by way of the source-drain of the MOSFET that constitutes the charging switching element 18 and the diode functioning as a rectifying device and is then supplied to the voltage conversion unit 160 (not shown in FIG. 3). In this manner, a boosted discharging operation is executed.

On the other hand, at the charging mode, the MOSFET that constitutes the charging switching element 18 is turned on and the MOSFET that constitutes the discharging switching element 16 is turned off, so that the electric power outputted from the fuel cell 110 (not shown in FIG. 3) is supplied to the secondary battery 120 (not shown in FIG. 3) by way of the coil 12 so as to perform the charging. Thereafter, when the MOSFECT that constitutes the charging switching element 18 is switched to OFF and at the same time the MOSFET that constitutes the discharging switching element 16 is switched to ON, the current flows through the source-drain of the MOSFET that constitutes the discharging switching element 16 and the diode functioning as a rectifying device. Hence, the energy stored in the coil 12 is cancelled. In this manner, a decreased charging operation is executed.

Now refer back to FIG. 1 to continue the description of the power supply apparatus 100. The voltmeter 150 measures the value of voltage which is outputted from the fuel cell 110 (the fuel cell 110 and the secondary battery 120 at the discharging mode) and which is inputted from the voltage conversion unit 160. The measured voltage value is sent to the control unit 190.

The voltage conversion unit 160 varies the voltage inputted from the fuel cell 110 (the fuel cell 110 and the secondary battery 120 at the discharging mode) to a predetermined voltage so as to be outputted. In the embodiments of the present invention, a DC/DC converter is used as the voltage conversion unit 160. Note that the degree of variation in voltage has a limitation in the DC/DC converter, namely the range in which the inputted voltage can be boosted or decreased is limited. The voltage conversion unit 160 adjusts the degree of variation in voltage according to an instruction from the control unit 190.

The ammeter 170 measures the value of current outputted from the voltage conversion unit 160. The current outputted from the voltage conversion unit 160 is supplied to the device 200 and therefore the ammeter 170 measures the output current value of the power supply apparatus 100. The current value measured is sent to the control unit 190.

The voltmeter 180 measures the value of voltage outputted from the voltage conversion unit 160. The voltage outputted from the voltage conversion unit 160 is supplied to the device 200 and therefore the voltmeter 180 measures the output voltage value of the power supply apparatus 100. The voltage value measured is sent to the control unit 190.

The control unit 190 is connected to the respective components that constitute the power supply apparatus 100, via not-shown wirings. The control unit 190 refers to the information sent from the ammeter and/or the voltmeter, sends to the charge-discharge unit 140 an instruction of switching to the discharging or charging mode, and sends to the voltage conversion unit 160 an instruction by which to determine the degree of variation in voltage conversion. Also, the control unit 190 controls start or stop of the fuel cell 100 in accordance with start or stop of the power supply apparatus 100 and controls an operation related to giving an instruction to terminate the charging mode and the like after detecting that the secondary battery has completed the charging.

Figure 4:
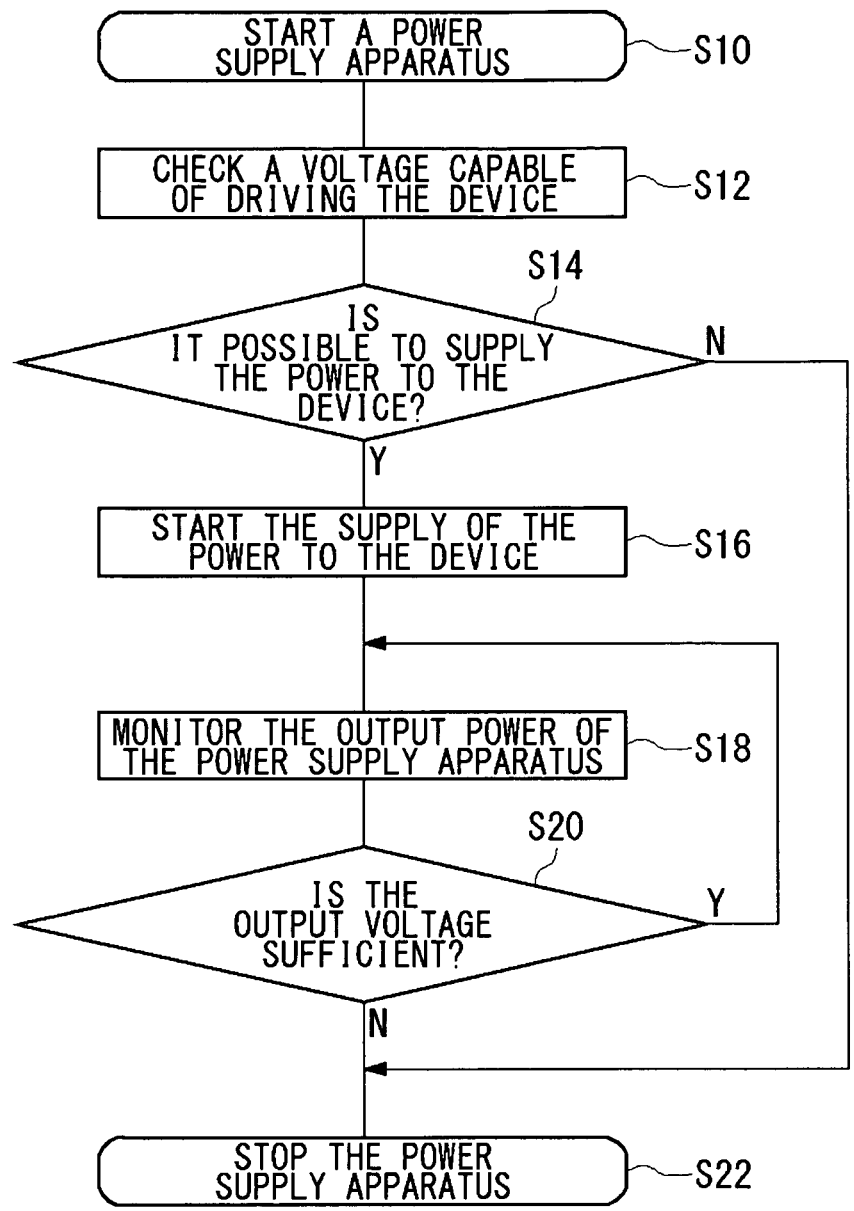
FIG. 4 is a flowchart showing an outline of a series of processes in a power supply apparatus.

FIG. 4 is a flowchart showing an outline of a series of processes in a power supply apparatus. When a user first turns on a start switch of the power supply apparatus 100, the power supply apparatus 100 is started (S10). With the power supply apparatus 100 started, the control unit 190 has the fuel cell 110 started. Another method may be employed for starting the power supply apparatus 100. And the control unit 190 may detect the connection of the power supply apparatus 100 to the device 200 and thereby start the fuel cell 110.

The control unit 190 boosts the voltage outputted from the fuel cell 110 in stages, by controlling the voltage conversion unit 160, and checks if the boosted voltage is suitable for the voltage capable of driving the device connected thereto (S12). If the boosted voltage is within a rage of voltage capable of driving the device and it is possible to supply the power to the device (Y of S14), the control unit 190 will start supplying the power (S16). If, on the other hand, the boosted voltage is outside the range of voltage capable of driving the device and it is not possible to supply the power to the device (N of S14), the control unit 190 will stop the operation of the power supply apparatus 100 (S22). The checking of suitable voltage (S12) and the determination of the supply of the power (S14) will be described later in detail with reference to FIG. 5 and FIG. 6.

After the power supply apparatus 100 has started supplying the electric power to the device, the control unit 190 monitors the output power of the power supply apparatus 100 (S18). If the control unit 190 determines that the output voltage of the power supply apparatus 100 is sufficient to meet the power requested by the device 200 (Y of S20), the control unit 190 will continue to monitor the output voltage of the power supply apparatus 100. If, on the other hand, it is determined that the output voltage of the power supply apparatus 100 is not sufficient to meet the power requested by the device 200 (N of S20), the device connected thereto cannot be operated stably, so that the control unit 190 will stop the power supply apparatus 100 (S22). A description will be given later in detail on the monitoring of the output power supply (S18) and the decision on the output voltage (S20) with reference to FIG. 7.

Figure 5:
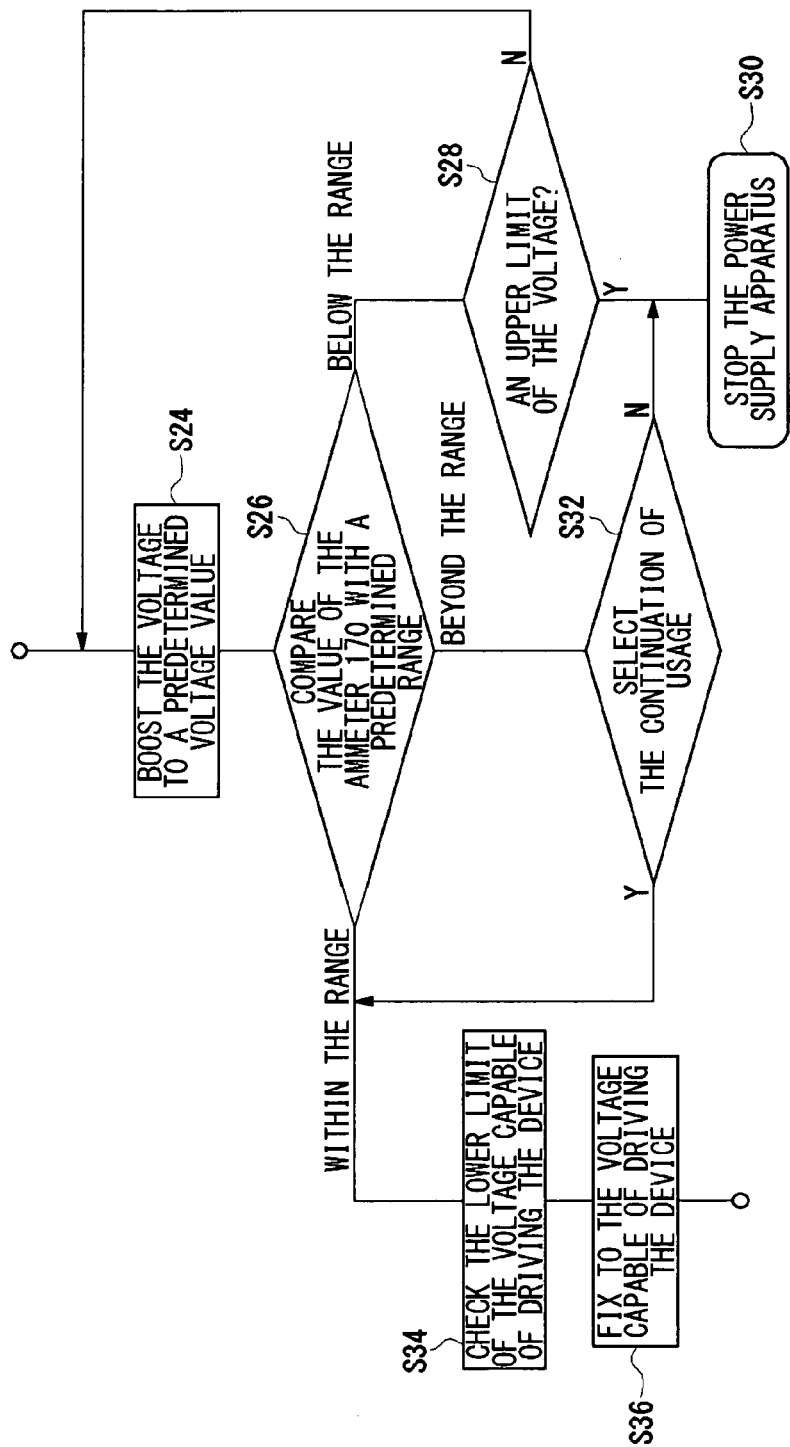
FIG. 5 is a flowchart showing a process for checking the voltage capable of driving a device connected.
Figure 6:
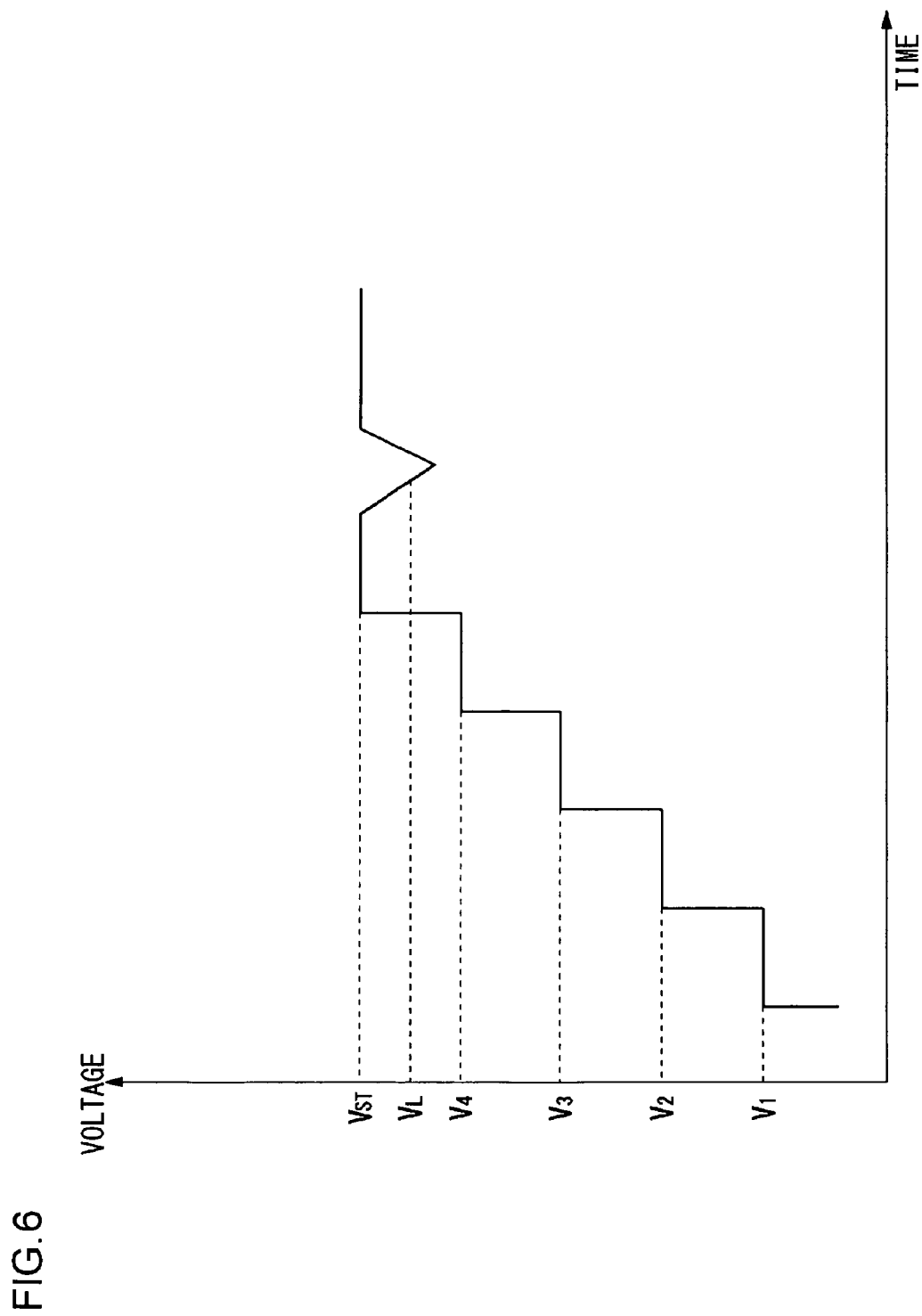
FIG. 6 shows a transition of an output voltage of a power supply apparatus in the course of checking a voltage capable of driving a device.

FIG. 5 is a flowchart showing a process for checking the voltage capable of driving the device connected thereto. FIG. 6 shows a transition of the output voltage of the power supply apparatus in the course of checking the voltage capable of driving the device. After the power supply apparatus 100 has been started, the control unit 190 sends an instruction to the voltage conversion unit 160 and boosts the output voltage of the fuel cell 110 to a predetermined voltage value V1 (S24). The control unit 190 compares the current value sent from the ammeter 170 with a predetermined range (S26).

A description will now be given of the "predetermined range". There are cases where a very small amount of current flows through the ammeter 170 even if the output voltage of the power supply apparatus 100 has not yet reached the voltage capable of driving the device 200. A current value corresponding to the lower limit of the predetermined range is used to distinguish the current measured by the ammeter 170 from such a very small amount of current. That is, the measured current is not the measurement value of the very small amount of current as long as it is greater than or equal to the lower limit of the predetermined range. The current value corresponding to the lower limit may be determined beforehand from experimental results.

The current value corresponding to the upper limit of the predetermined range is so determined as to correspond to an upper-limit power of the power supply apparatus 100. The power supply apparatus 100 uses the fuel cell 110 as the power supply and outputs variably a voltage outputted from the fuel cell 110 using the voltage conversion unit 160. Accordingly, the current-power characteristic and the current-voltage characteristic of the power supply apparatus 100 exhibit the same shapes as those shown in FIG. 2. The current and voltage at which the output power of the power supply apparatus 100 becomes maximum during a stable operation of the fuel cell 110 are denoted by Id and Vd, respectively, and a description will be given hereinbelow using these notations.

If the power required by the device 200 connected to the power supply apparatus 100 is greater than the maximum output of the power supply apparatus 100, the output current of the power supply apparatus 100 will be greater than Id. In such a case, the output voltage will be lower than Vd. As a result, the output power of the power supply apparatus 100 drops and therefore the device 200 can no longer be operated stably. Since the output voltage of the power supply apparatus 100 is lower than Id, it is speculated that the output voltage of the fuel cell 110 which is the power supply of the power supply apparatus 100 is also lower than $V_{OP}$. When the control unit 190 detects this status, it switches the mode of the charge-discharge unit 140 to the discharging mode and supplements the power supply with the electric power from the secondary battery 120.

The secondary battery 120 is a power supply only to assist the fuel cell 110 and it is difficult to sustainably combine use of two power supplies which are the fuel cell 110 and the secondary battery 120. That is, if the output current of the power supply apparatus 100 is below Id, the power can be stably supplied to the device 200 connected to the power supply apparatus 100. Accordingly, the control unit 190 stores beforehand the current value Id as an upper limit of a predetermined range, and compares the output current value of the ammeter 170 with the predetermined range (S26).

Referring back to FIG. 5, the description continues. If the measurement value of the ammeter 170 is below the predetermined range (to the right of S26 in FIG. 5), the control unit 190 will check the upper-limit voltage of the voltage conversion unit 160 capable of being boosted. This is because, as described above, the range of the varying voltage of the voltage conversion unit 160 is bounded. If the value of V1 is not the upper-limit voltage (N of S28), the control unit 190 will send an instruction to the voltage conversion unit 160 so as to boost the voltage, inputted from the fuel cell 110, to V2 (S24). Once again, the control unit 190 compares the value of the ammeter 170 with the predetermined range (S26). This processing is repeated until the value of the ammeter 170 falls within the predetermined range, so that the voltage is boosted in stages of V1, V2, V3, V4 and the like.

In general, the number of kinds of voltages capable of driving a device used by connecting the device to an external power supply is not so many. Accordingly, boosting the output voltage of the power supply apparatus 100 in stages so as to check the voltage capable of driving the device 200 is more efficient than boosting the voltage continuously to check it.

The secondary battery 120 according to the present embodiment may be comprised of a plurality of secondary batteries instead of being comprised of a single secondary battery. Where the secondary battery 120 is comprised of a plurality of secondary batteries, the voltage of the power supply apparatus 100 may be boosted in stages, without using the voltage conversion unit 160, in a manner that a plurality of secondary batteries are connected in series in stages after the voltage supply from the fuel cell 110 has been stopped. The device 200 often uses a commonly-used dry battery as the external power supply, so that the voltage capable of driving the device 200 is often set to a multiple of 1.5 V which is the voltage of the dry battery. Accordingly, if each of a plurality of secondary batteries is set to 1.5 V, the voltage capable of driving the device 200 can be checked.

After having boosted to a certain voltage, it is preferable that a period of time until the voltage will be boosted to the next voltage (time elapsed from when the voltage is boosted to V1 until when boosted to V2 in FIG. 6) be as short as practical. The power supply apparatus 100 can detect the voltage capable of driving the device 200 in a shorter time. In preferred embodiments of the present invention, the number of boosting steps or degree of increase may be set to a multiple of the voltage of the dry cell, as described above. Or it may be set in consideration of the kind of the voltage capable of driving the device 200. In the former case, the voltage is boosted in stages of 3 V, 6 V, 9 V, 12 V, 15 V, 18 V, 21 V and 24 V. In the latter case, the voltage is boosted in stages of 5 V, 10 V, 15 V, 20 V and 25 V.

When the voltage boosted in stages reaches a voltage $V_{ST}$ capable of driving the device, current falling within a predetermined range flows through the ammeter 170. The control unit 190 detects that the boosted voltage has reached the voltage capable of driving the device (to the left of S26 in FIG. 5) and decreases the boosted voltage gradually as shown in FIG. 6. When the thus decreased voltage becomes lower than $V_L$, a transition is made from one state where the current value measured by the ammeter 170 corresponds to a predetermined range to another state where it is less than the predetermined range. The control unit 190 detects this change in the transition from one state to another, and detects $V_L$ which is the lower limit of the voltage capable of driving the device.

It is found that, by performing such a processing described above, the output voltage from the power supply apparatus 100 needs only to be in the range between $V_{ST}$ and $V_L$ in order to drive the device 200 connected thereto. Then the control unit 190 boosts the voltage up to $V_{ST}$ in order to operate the device 200 safely (S36).

On the other hand, if the measurement value of the ammeter 170 is beyond the predetermined range (downward direction of S26 in FIG. 5), the control unit 190 will inquire a user about whether he/she wishes to continue to use the power supply apparatus 100, using a monitor (not shown in FIG. 1). This is because there are cases where the power cannot be supplied stably to the device 200 if the power supply apparatus 100 continues to be used under the above-mentioned condition. When the user requests the continuation of usage in spite of the fact that the power can no longer be supplied stably (Y of S32), the lower limit of the voltage capable of driving the device is checked (S34) and then the power continues to be supplied as long as possible (S36). If, on the other hand, the user does not request the continuation of usage (N of S32), the control unit 190 will stop the power supply apparatus 100 (S30).

Figure 7:
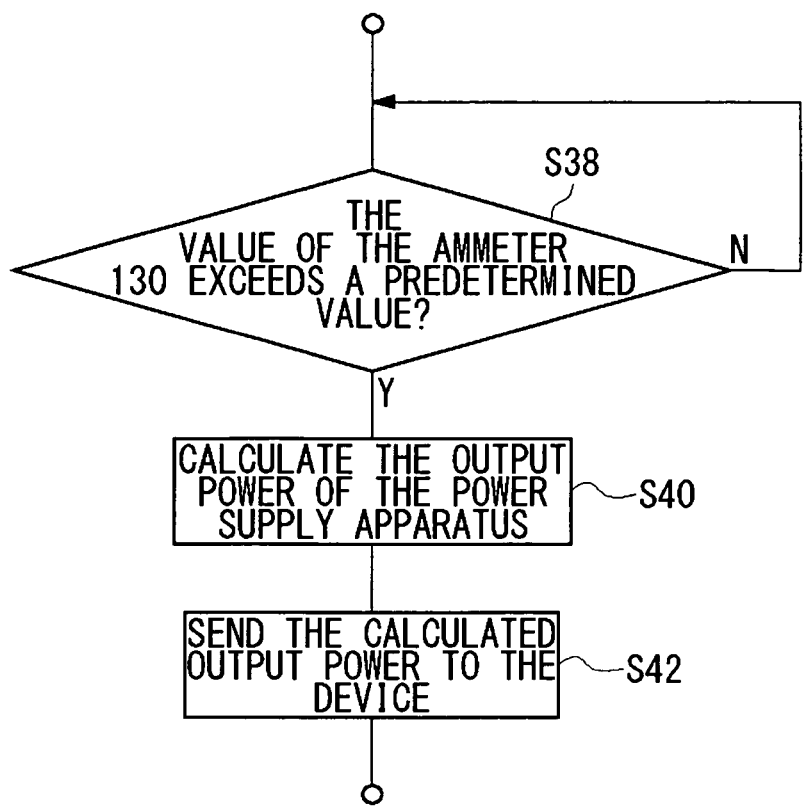
FIG. 7 is a flowchart showing a process for monitoring the output power of a power supply apparatus.

FIG. 7 is a flowchart showing a process for monitoring the output power of the power supply apparatus. The control unit 190 compares a value of the ammeter 130, which measures the output current of the secondary battery 120, with a predetermined value.

A description will now be given of the predetermined value. Similarly to the fuel cell 110, the maximum output of the secondary battery 120 is first measured in advance. As shown in FIG. 2, the maximum output of the fuel cell 110 varies depending on the state. For example, although the maximum output during a stable operation is $P_{max}$, the maximum output at the start is lower than $P_{max}$. At the same time, the maximum output of the secondary battery 120 doesn't vary very much as compared with the fuel cell 110. As a result, the maximum output of the secondary battery 120 is uniquely determined to a certain degree.

In order that the secondary battery 120 can operate safely, a value $P_{ACC}$ which is slightly lower than the maximum output value thereof is determined. For example, 80% of the maximum output value thereof may be set as the $P_{ACC}$ or an optimum value may be obtained as a experimental results. An output current $I_{ACC}$ at the time the output power is $P_{ACC}$ is measured and the $I_{ACC}$ is used as the predetermined value.

As the power of the fuel cell 110 becomes insufficient to meet the required power level, the secondary battery 120 starts outputting the power. With the power supplied from the secondary battery 120, the output voltage of the fuel cell 110 which has been below $V_{OP}$ is returned to $V_{OP}$. If the measurement value of the ammeter 130 does not exceed the predetermined value (N of S38), the control unit 190 will continue to monitor the value of the ammeter 130.

When the value of the ammeter 130 exceeds the predetermined value (Y of S38), namely when the required power exceeds the power which the secondary battery can supply safely, the control unit 190 calculates the output power of the power supply apparatus 100 using the then values of the ammeter 170 and the voltmeter 180 (S40). Since the calculated output power is the maximum power that the fuel cell 110 and the secondary battery 120 can supply safely, it can be used as an upper-limit target of power that can be outputted safely from the power supply apparatus 100. The control unit 190 sends a calculated upper-limit target value to the device 200 by the use of the voltage conversion unit 160 (S42).

If the voltage conversion unit 160 has already reached the upper-limit voltage that could possibly be boosted (Y of S28), the power supply apparatus 100 cannot supply the voltage necessary for driving the device 200. In such a case, the control unit 190 stops the power supply apparatus 100.

Figure 8:
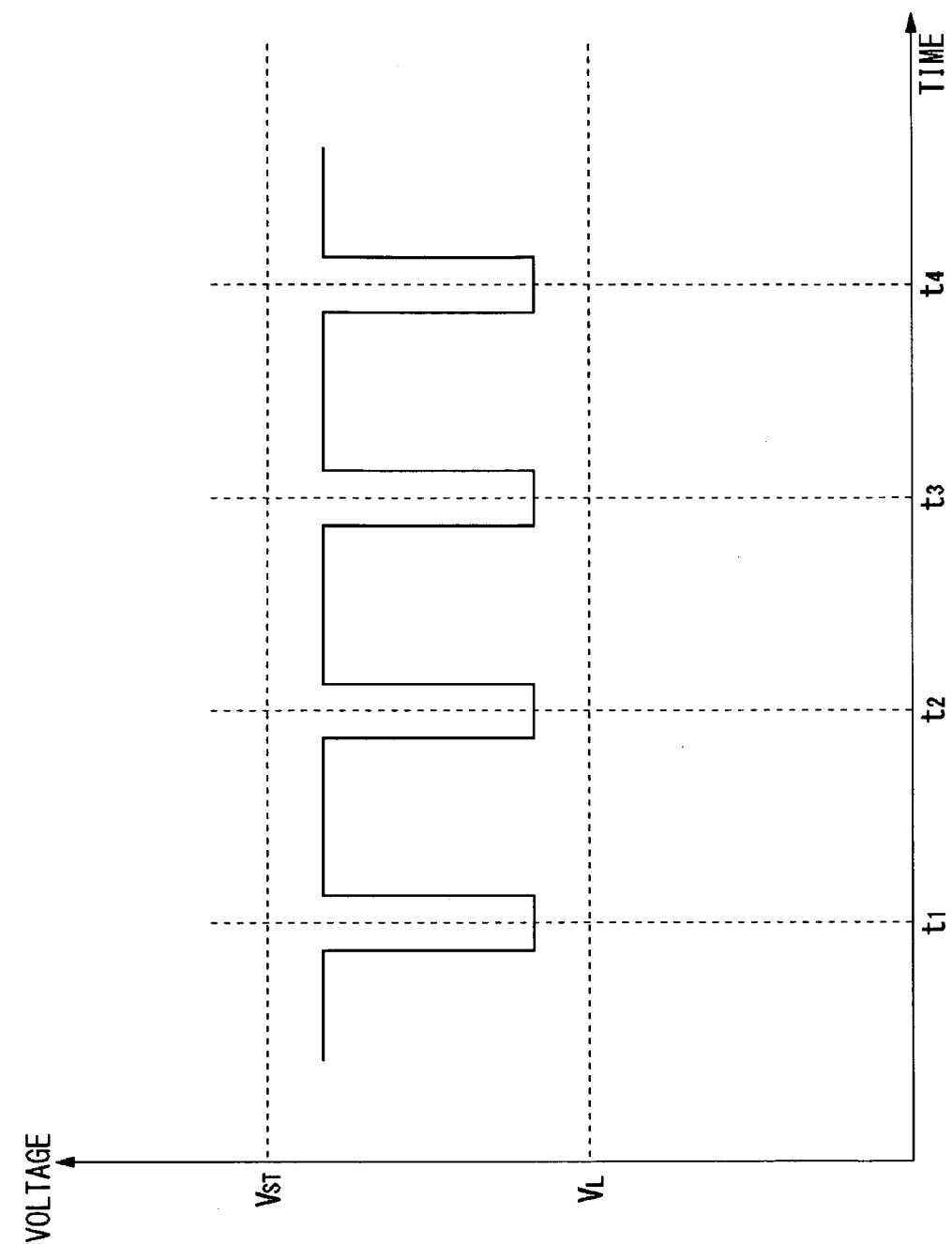
FIG. 8 illustrates a transition of output voltage of a power supply apparatus when the upper-limit target of power is sent to a device.

FIG. 8 illustrates a transition of the output voltage of the power supply apparatus when the upper-limit target of power is sent to the device. The control unit 190 has already detected the voltage $V_{ST}$ capable of driving the device 200 connected to the power supply apparatus 100 and the lower limit $V_L$ of the voltage capable of driving the device 200 connected thereto. Also, the control unit 190 can vary the output voltage of the power supply apparatus 100 by use of the voltage conversion unit 160. Thus, the control unit 190 varies the output voltage of the power supply apparatus 100 periodically within the range of $V_{ST}$ and $V_L$, so that it can send information to the device 200.

The interval between $t_1$ and $t_2$, the interval between $t_2$ and $t_3$ and the interval between $t_3$ and $t_4$ are all equal to one another in FIG. 8. That is, this interval is a voltage conversion cycle. Using a function that associates an upper-limit target value with a voltage conversion cycle, the control unit 190 can convert an upper-limit target value of power into a voltage conversion cycle. If the device 200 has information on an inverse function of this function, the voltage conversion cycle can be converted into the upper-limit value by use of the inverse function after the voltage conversion cycle thereof has been detected from a change in voltage inputted from the power supply apparatus 100. Note that the voltage conversion unit 160 can vary the voltage in 20 ms or so.

If the device 200 has a function of managing the power used in the device 200, the power used can be so managed as not to exceed the upper-limit target value sent from the power supply apparatus 100. Thereby, the power supply apparatus 100 can stably supply the power to the device 200 and the user can use the device 200 comfortably.

So far, the limit of power that the fuel cell 110 and the secondary battery 120 can supply safely is set as an upper-limit target value of output power of the power supply apparatus 100. However, a value obtained using another method may serve as the upper-limit target value. Such another method will be described as follows.

In FIG. 2 the current-power characteristic and the current-voltage characteristic of the fuel cell 110 are shown, and a description has been given of a case where the output current becomes $I_{OP1}$ and the output voltage becomes $V_{OP}$ when the output power of the fuel cell 110 operating safely is $P_{OP1}$. If the power required by the fuel cell 110 is larger than $P_{OP1}$ the output current of the fuel cell 110 will be larger than $I_{OP1}$. In such a case, the output voltage is lower than $V_{OP}$, so that the output power of the fuel cell 110 drops and therefore the device 200 connected to fuel cell 110 cannot be stably operated.

The control unit 190 compares the voltage value measured by the voltmeter 150 with $V_{OP}$. And if the voltage value measured is lower than $V_{OP}$, the control unit 190 will determine that the output power value of the fuel cell 110 is insufficient to meet the power required by the device 200, and then the control unit 190 will switch the mode of the charge-discharge unit 140 to the discharging mode. As described above, the power supply apparatus 100 uses the fuel cell 110 as the power source, so that the current-power characteristic and the current-voltage characteristic of the power supply apparatus 100 are of the same shapes as those of fuel cell 110 shown in FIG. 2.

The control unit 190 calculates the output power of the power supply apparatus 100 by using values of the ammeter 170 and the voltmeter 180 obtained when a transition is made from a state where the output voltage thereof exceeds $V_{OP}$ to a state where the output voltage of the fuel cell 110 falls below $V_{OP}$. The output power calculated in FIG. 7 is the maximum power that the fuel cell 110 and the secondary battery 120 can supply safely, whereas the output power calculated this time is the maximum power that the fuel cell 110 can supply safely. If the output power of the secondary battery is basically thought of as being supplementary power, the output power calculated here may be an upper-limit target of power that can be outputted safely from the power supply apparatus 100.

The power supply apparatus 100 may send information other than the information on the upper-limit target of power supplied to the device 200 connected thereto. For example, the control unit 190 may detect, by a sensor, that the fuel of the fuel cell 110 is insufficient, and send to the device 200 the information indicating that the fuel is insufficient. In such a case, if the device 200 is provided with a monitor, displaying the warning on the display can prompt the user to take necessary action quickly in response thereto. The power supply apparatus 100 may have a monitor, LEDs and the like to present the information. Besides the amount of fuel of the fuel cell 110, the power supply apparatus 100 may send information on the fuel cell 110 such as information indicating that the secondary battery 120 needs to be recharged and any abnormality in the fuel cell 110.

Figure 9:
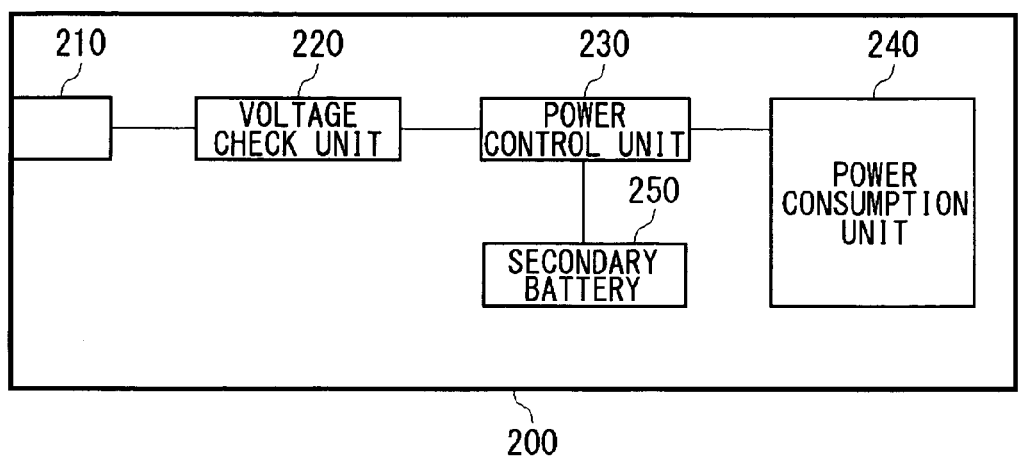
FIG. 9 schematically illustrates a general structure of a device connected to a power supply apparatus.

FIG. 9 schematically illustrates a general structure of the device connected to the power supply apparatus. The device 200 includes a connector 210, a voltage check unit 220, a power control unit 230, a power consumption unit 240, and a secondary battery 250. The connector 210 has a function necessary for connecting the device 200 to an external power source. The connector 210 is connected to the voltage check unit 220.

The voltage check unit 220 checks if the voltage inputted from the external power source via the connector 210 is sufficient to drive the device 200. If the voltage inputted from the external power source is suitable for the voltage capable of driving the device 200, the power from the external power source will be outputted to the power control unit 230; and if not suitable, the power from the external power source will not be outputted to the power control unit 230 in order to prevent failure of the device 200.

The power control unit 230 converts the voltage inputted from the external power source, into voltage suitable for each member in the power consumption unit 240 so as to supply the power to the each member. The power consumption unit 240 is a collective term for the respective members that use the power in the device 200. If the device 200 is a notebook personal computer, the respective members in the power consumption unit 240 will include a CPU (Central Processing Unit), a DVD drive and the like.

If the external power source is not connected to the device 200, the secondary battery 250 will play the role of supplying the power to the power control unit 230.

As described above, the power supply apparatus 100 according to the preferred embodiment of the present invention varies the output voltage, so that the information on an upper-limit target value of the power can be sent to the device 200 connected thereto. The device 200 includes the voltage check unit 220, so that it can detect the variation in the inputted voltage. However, it cannot detect that the voltage is varied in a predetermined cycle. Also, the upper-limit target value of the power cannot be acquired from the predetermined cycle using an inverse function.

When the device 200 is a notebook PC, the power control unit 230 is often managed by software. Accordingly, it is possible to install the software, having functions to detect a predetermined cycle from the variation in voltage and to acquire the upper-limit target value of the power, in the device 200. Adding a new function to the software that manages the power control unit 230 enables for the device 200 to acquire the upper-limit value of the power in the power supply apparatus 100.

If, in this manner, a function can be newly added to the power control unit 230 by updating the software, a device having such a new function will no longer be needed, thus improving convenience of the user using the device 200. To use the power of the secondary battery 230 effectively, the power control unit 230 may already have a function of managing the power supplied to each member in the power consumption unit 240. If the power control unit 230 has such a function and it is possible to acquire the upper-limit target value of the power, the power of the power supply apparatus 100 connected thereto can be used effectively according to the acquired value.

If the upper-limit target value of the power supply apparatus 100 is smaller than a required power, it may be conceivable that the use of some of members in the power consumption unit 240, such as the DVD drive, which do not necessitate the usage, is prohibited. With this processing, the user can use more comfortably the power of the power supply apparatus 100.

However, the software having a new function may not be installed in all of devices connected to the power supply apparatus 100. For example, if the power control unit 230 is not managed by software, the upper-limit target value of the power cannot be acquired by updating the software. In such a case, if the output power value of the power supply apparatus 100 is sufficient to satisfy the power required by the device 200, the user can use the device 200 without problems.

If the output power value of the power supply apparatus 100 is insufficient to satisfy the power required by the device 200, the control unit 190 will stop the operation of the power supply apparatus 100 as illustrated in the flowchart of FIG. 4. In such a case, the device 200 cannot use the power of the power supply apparatus 100 and therefore will use the power of the secondary battery 250.

The fuel cell may be an active type fuel cell. An example of the power supply apparatus where the fuel cell is the active type fuel cell is described hereinbelow. In particular, a description of a structure of the fuel cell is given in detail.

Figure 10:
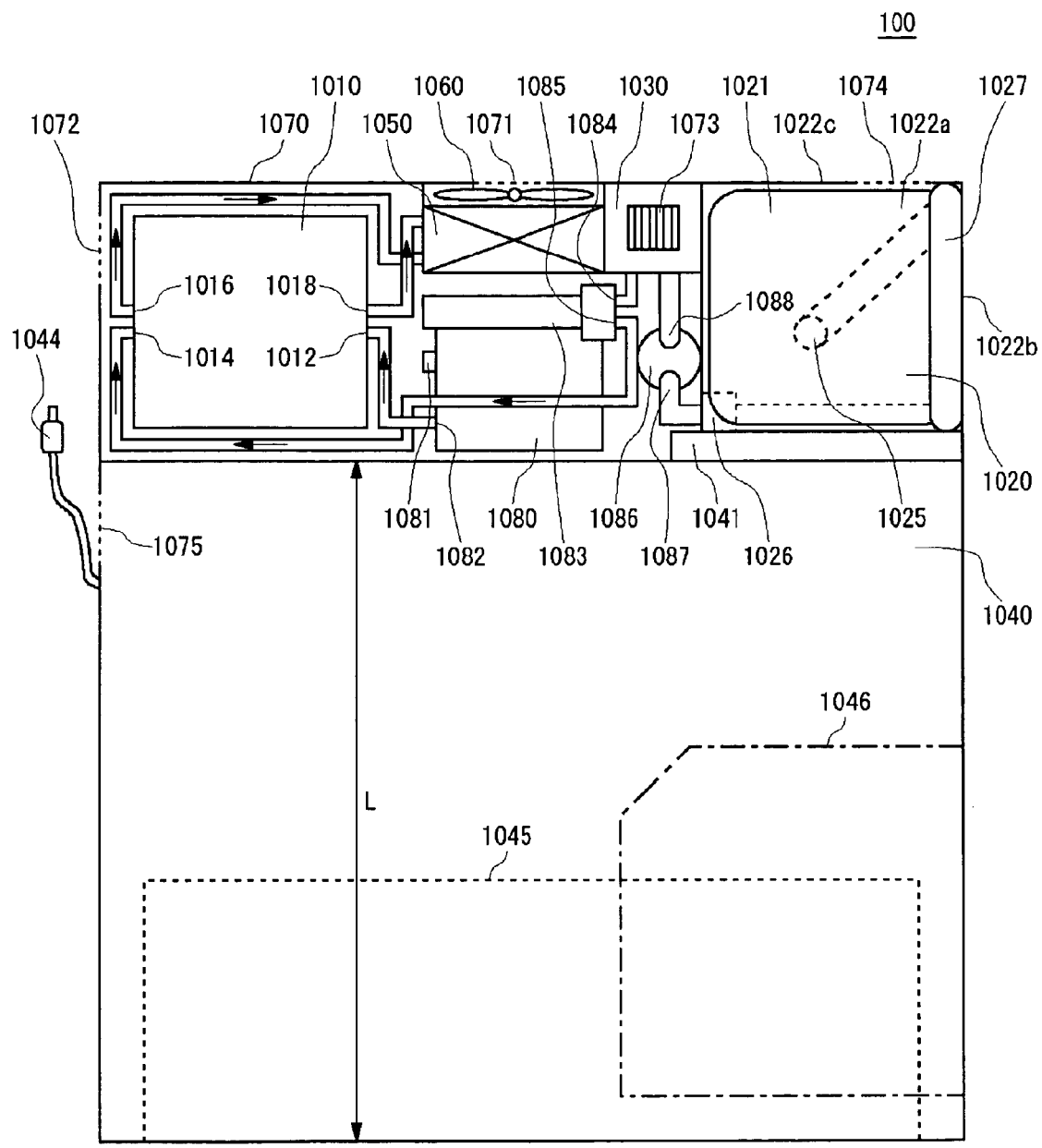
FIG. 10 is a schematic top view showing a structure of a power supply apparatus in a case where a fuel cell is an active type fuel cell.

FIG. 10 is a schematic top view showing a structure of the power supply apparatus 100. The power supply apparatus 100 includes a DMFC (direct methanol fuel cell) 1010 which generates electric power by supplying methanol water solution or pure methanol to an anode, a methanol tank 1020 which contains high concentration methanol water solution of greater than or equal to 16 mol/L, a buffer tank 1030 in which the methanol supplied from the methanol tank 1020 is diluted into a concentration of approximately 1 to 2.0 mol/L and then the methanol water solution (fuel) to be supplied to the DMFC 1010 is stored, a control unit 1040 which controls a power conversion apparatus or auxiliaries, a heat exchanger 1050, an axial-flow fan 1060, and a housing 1070. The control unit 1040 also includes a function of processing found in the control unit 190 shown in FIG. 1. Although not shown in FIG. 10, the power supply apparatus 100 includes, by necessity, the charge-discharge unit, the voltage conversion unit, the ammeter and the voltmeter as shown in FIG. 1.

The high-concentration methanol water solution or pure methanol is periodically supplemented to the buffer tank 1030 from the methanol tank 1020. Alternatively, the concentration of the methanol water solution in the buffer tank 1030 is monitored, and whenever it is detected that the concentration thereof has fallen below a predetermined threshold value, for example, 1.0 mol/L, high-concentration methanol water solution or pure methanol is supplied to refill the buffer tank 1030 from the methanol tank 1020. The methanol tank 1020 contains therein a pack 1021 constituted by material having flexibility and high methanol (alcohol) resistance. A material having a two-layered structure where polyethylene or Teflon (registered trademark) is arranged inside and synthetic fiber, such as nylon, is arranged outside is suitable as the material, having flexibility and high methanol resistance, which constitutes the pack 1021. Wall surfaces 1022 of the methanol tank 1020, composed of a planar surface 1022$a$, a side surface 1022$b$ and a back surface 1022$c$, constitute part of the housing 1070. An air vent 1074 provided in the back surface 1022$c$ is structured and operated in such a manner that no differential pressure develops between a portion other than the pack 1021 inside the methanol tank 1020 and the outside of the power supply apparatus 100 when the methanol in the methanol tank 1020 is consumed and the volume inside the pack 1021 becomes smaller. Also, it functions as a slip stopper when the methanol tank 1020 is attached to or removed from the power supply apparatus 100. A methanol extraction port 1025 is provided on the bottom surface of the pack 1021, and this methanol extraction port 1025 and a joint 1026 are connected together by an extraction pipe 1027. The extraction pipe 1027 is transparent and thicker than the pack 1021. The extraction pipe 1027 is suitably produced using silicon rubber whereas the joint 1026 is suitably produced using polypropylene.

An air vent 1073 is provided in the housing 1070 above the buffer tank 1030. The buffer tank 1030 is a tank used to dilute the methanol fed from the methanol tank 1020 into a predetermined concentration of approximately 1.2±0.3 mol/L (in the present embodiment). The buffer tank 1030 is also used as a vapor-liquid separating unit for separating vapor from liquid among air, generated water, methanol water solution, carbon dioxide and the like. That is, the air or carbon dioxide in gaseous phase is discharged through the air vent 1073 in the buffer tank 1030. The air vent 1073 has a not-shown filter, and byproducts such as formic acid and formaldehyde is absorbed by the filter when the air or carbon dioxide is discharged from the air vent 1073.

Air (oxidant) is supplied to a cathode of the DMFC 1010 from an air pump 1080, and the methanol water solution is supplied to an anode thereof by way of a first liquid pump 1083 from the buffer tank 1030. An air introducing hole 1081 of the air pump 1080 is provided in the center of the power supply apparatus 100. The air taken in from the air introducing hole 1081 of the air pump 1080 is fed into a cathode inlet 1012 of the DMFC 1010 from an air discharge outlet 1082. On the other hand, a structure is such that the first liquid pump 1083 takes in the methanol water solution diluted to the concentration of approximately 1.2 mol/L, from the buffer tank 1030 through a liquid introducing hole 1084 and the diluted methanol water solution is delivered from the liquid discharge outlet 1085 to an anode inlet 1014 of the DMFC 1010. When the concentration of methanol in the buffer tank 1030 has fallen below a predetermined threshold concentration, a second liquid pump 1086 takes in high-concentration methanol water solution or pure methanol from the methanol tank 1020 via a liquid introducing hole 1087 so as to be supplied to the buffer tank 1030. Alternatively, the second liquid pump 1086 periodically takes in high-concentration methanol water solution or pure methanol from the methanol tank 1020 via the liquid introducing hole 1087 so as to be supplied to the buffer tank 1030.

The air and generated water discharged from the cathode of the DMFC 1010 is discharged from a cathode outlet 1016, whereas the methanol water solution and carbon dioxide discharged from the anode of the DMFC 1010 is discharged from an anode outlet 1018. Emission material discharged from the cathode outlet 1016 and the anode outlet 1018 is introduced into the heat exchanger 1050 so as to be united and enter the buffer tank 1030. The air whose temperature is lower than the operating temperature (60±3° C.) of the DMFC 1010 by approximately 5 to 15° C. is supplied to the air introducing hole 1081 and the heat exchanger 1050. Thus, the air, generated water, methanol water solution, carbon dioxide and the like of approximately 70° C. discharged from the DMFC 1010 are sufficiently condensed by the heat exchanger 1050. As a result, there is no need to replenish the moisture from the outside. This can prevent the methanol from being discharged externally and can therefore prevent the increase in consumption thereof.

When the DMFC 1010 generates power, the exothermal reaction takes place. Thus, supplying the air and the methanol water solution to the DMFC 1010 causes the temperature of the DMFC 1010 to rise. Hence, a thermistor or limiter (not shown) is mounted on the DMFC 1010; and when the temperature of the DMFC 1010 reaches approximately −5° C. less the operating temperature of the DMFC 1010 (60±3° C.), namely 55° C. in the present embodiment, the axial-flow fan 1060 is started. An air vent 1071 is provided in a position of the housing 1070 counter to the axial-flow fan 1060, and an air vent 1072 is provided in a position that surrounds the DMFC 1010. As a result, when the axial-flow fan 1060 is started, the air is circulated around the DMFC 1010 so as to air-cool the DMFC 1010. Thereby, the temperature of the DMFC 1010 can be set to (60±3° C.). An air vent 1075 is also provided.

Figure 11:
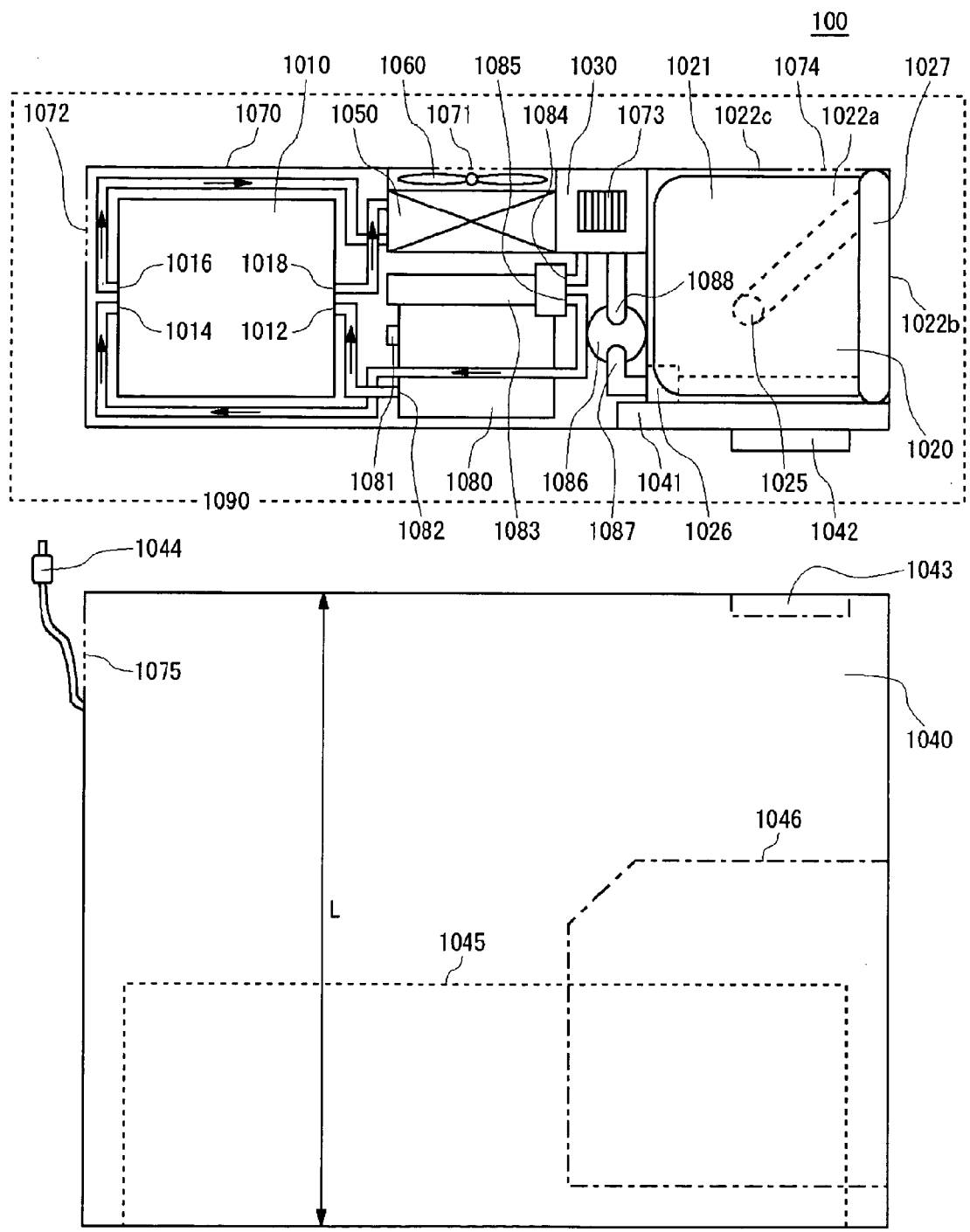
FIG. 11 schematically illustrates a structure where a power supply apparatus is separated into a fuel cell unit and a control unit.
Figure 12:
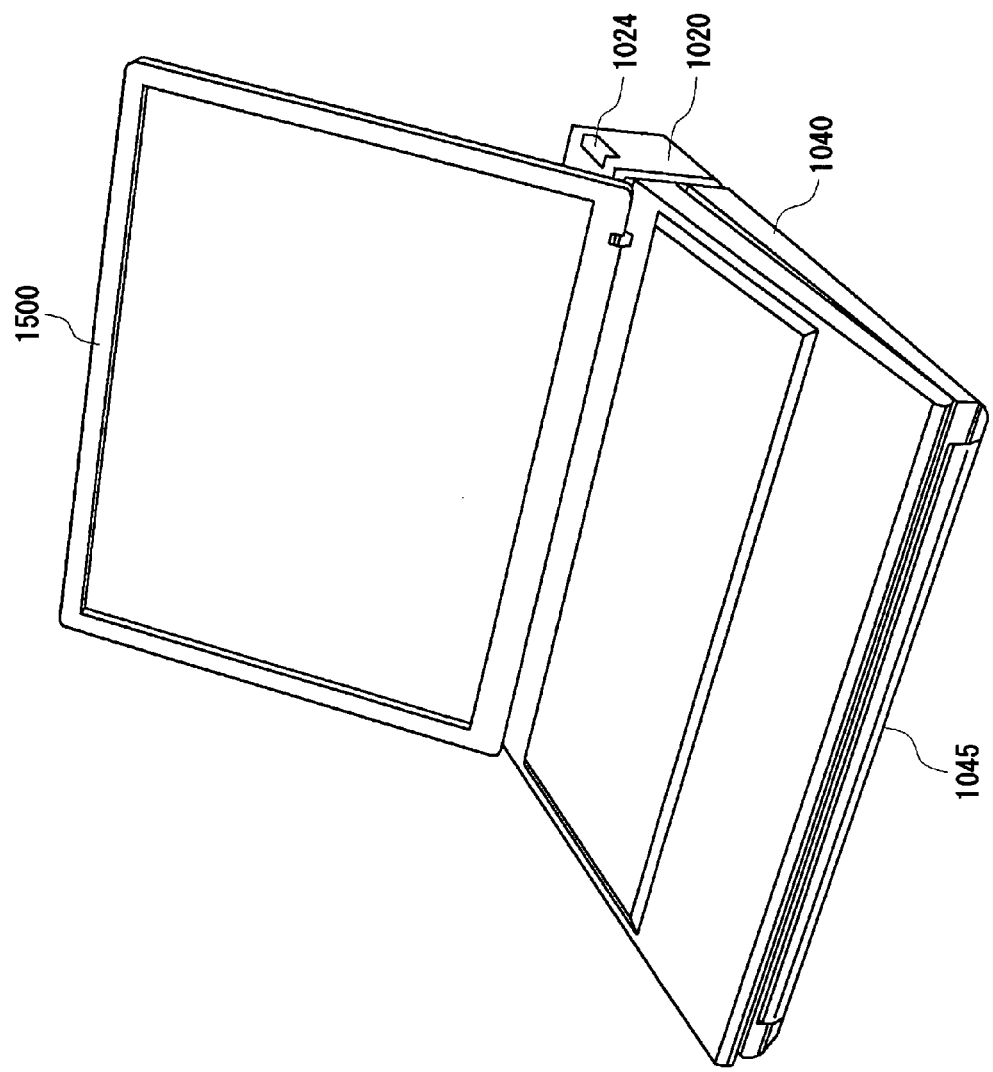
FIG. 12 is an overall perspective view of a notebook personal computer with a power supply apparatus mounted thereon.

The control unit 1040 is structured so that the control unit 1040 can be separated from a fuel cell unit 1090 as shown in FIG. 11. A communication unit 1041 electrically connects the fuel cell unit 1090 to the control unit 1040. The communication unit 1041 is a sealed space in the fuel cell unit 1090 such that no moisture enters and leaves the communication unit 1041. Also, the communication unit 1041 is structured so that the communication unit 1041 can communicated with the control unit 1040 and transfer the power through a connector 1042. An insertion part 1043 is so provided that the connector 1042 is inserted into the insertion part 1043 in the side of the control unit 1040. The control unit 1040 can be replaced depending on a device to which the power supply apparatus 100 of the present embodiment supplies the electric power. In the case of the present embodiment, the bottom face of a notebook PC 1500 is placed on the control unit 1040 to supply the power to the notebook PC 1500, and the power can be supplied to the notebook PC 1500 by inserting a power supply cable (not shown) into a power supply cable insertion part of the notebook PC 1500. A fuel level display window 1024 for indicating the remaining amount of fuel is provided in the methanol tank 1020.

Figure 13:
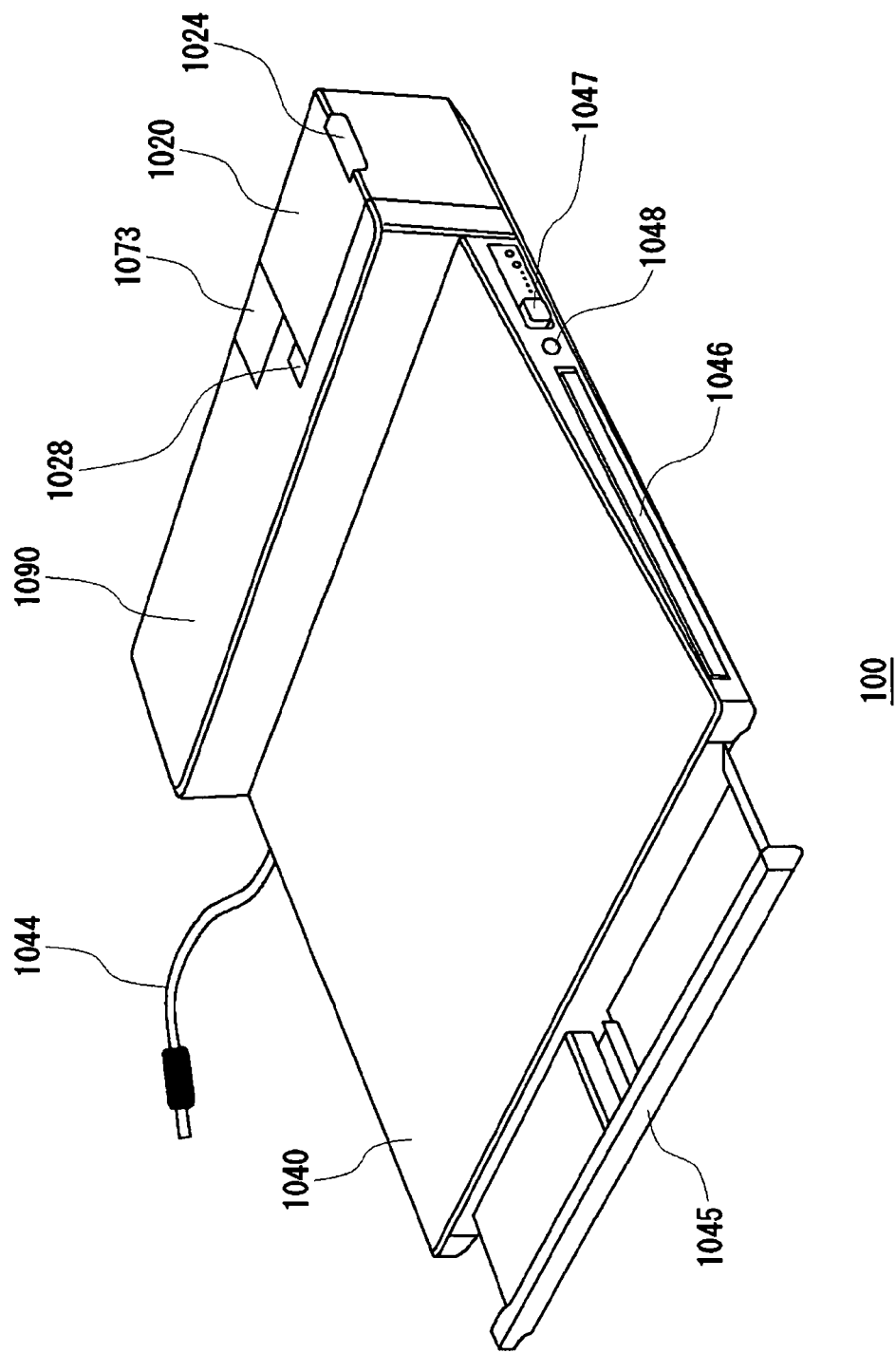
FIG. 13 an overall perspective view of a notebook PC where a slide support unit of a power supply apparatus is pulled to open.

As shown in FIG. 13, if the notebook PC 1500 is larger than the control unit 1040 particularly in the dimension of L or if the power supply cable insertion part of the notebook PC 1500 is provided on the back face of the notebook PC 1500 instead of the side surface thereof, a slide support unit 1045 is pulled to open to support the notebook PC 1500. This is because when the notebook PC 1500 is placed on the control unit 1040, a gap is created on the bottom of the notebook PC 1500 and the mounting becomes unstable. A power supply switch 1047 is a switch for turning on and off the power supply apparatus 100. And when the power supply apparatus 100 supplies the electric power to a device, such as the notebook PC 1500, to which the electric power is to be supplied, this power supply switch 1047 is firstly pressed down to start the power supply apparatus 100. In order to remove the methanol tank 1020, a lock release button 1028 unlocks the lock state where the methanol tank 1020 and the power supply apparatus 100 are locked together.

In this manner, the fuel cell unit 1090 and the control unit 1040 are so structured as to be separable from each other, or the control unit 1040 is so structured as be replaceable according to a device to which the power is to be supplied. As a result, the fuel cell unit 1090 is put to a common use, so that it can be adapted to various applications. In particular, the power supply apparatus 100 according to the present embodiment not only can supply the power via a power supply cable 1044 to a device, such as the notebook PC 1500, to which the power is to be supplied but also can be used as a charger of the secondary battery by inserting the secondary battery into the a secondary battery insertion part 1046 provided in the control unit 1040.

A terminal 1048 for charging a secondary battery is a terminal through which an AC adapter is connected to the power supply apparatus 100. If the fuel cell described as above is in operation and can afford to spare the power supply, the secondary battery in the power supply apparatus 100 can be recharged using the power of the fuel cell. If, however, the fuel cell is not in operation, the secondary battery cannot be recharged. If the AC adapter is connected to the secondary battery charging terminal 1048, the secondary battery can be recharged regardless of whether the fuel cell is in operation or not, so that the power supply apparatus 100 can supply the power more stably.

At the start of the power supply apparatus 100, the control unit 1040 starts the fuel cell using the power of the secondary battery. Thus, there are cases where the power supply apparatus 100 cannot be started if the power of the secondary battery is insufficient. In such a case, the power supply apparatus 100 may be started by connecting the AC adapter to the secondary battery charging terminal 1048 and then directly supplying the power to the control unit 1040.

The power supply cable 1044 is connected to a device to which the power is to be supplied. Such a device has an input terminal, for external power source, connected to an external power source such as an AC adapter. An output terminal fit to the shape of the input terminal for external power source is provided in the tip of the power supply cable 1044. The secondary battery charging terminal 1048 is connected to the AC adapter, too. Thus it is possible to plug the output terminal of the power supply cable 1044 into the secondary battery charging terminal 1048. In order to prevent such a possible erroneous connection, it is preferably the length of the power supply cable 1044 be adjusted so that the output terminal of the power supply cable 1048 cannot be plugged into the secondary battery charging terminal 1048.

A description is now given of another example of the power supply apparatus where the fuel cell is the active type fuel cell. The structure of the fuel cell will be particularly described in detail.

Figure 14:
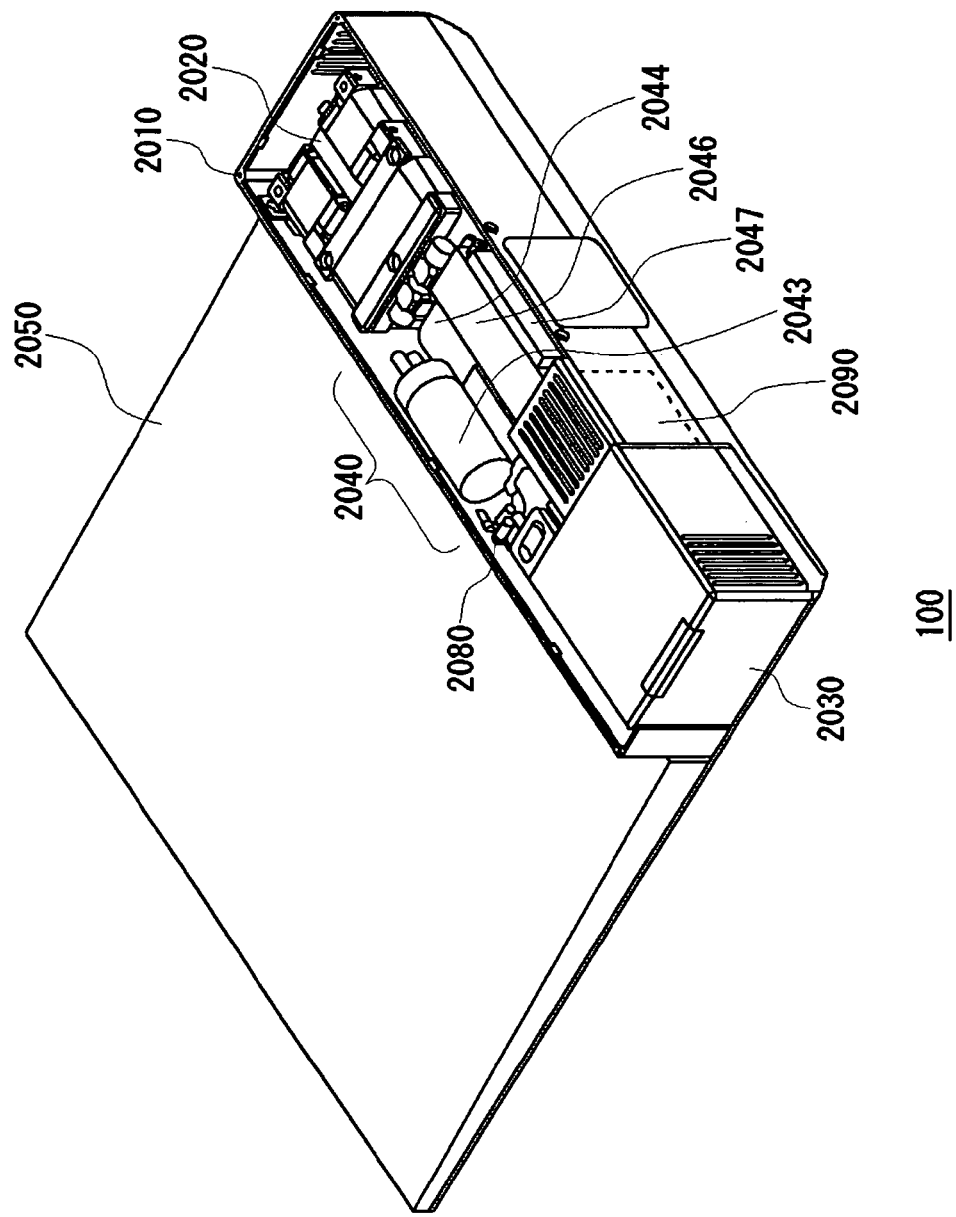
FIG. 14 is a perspective view of a power supply apparatus where a fuel cell is an active type fuel cell.
Figure 15:
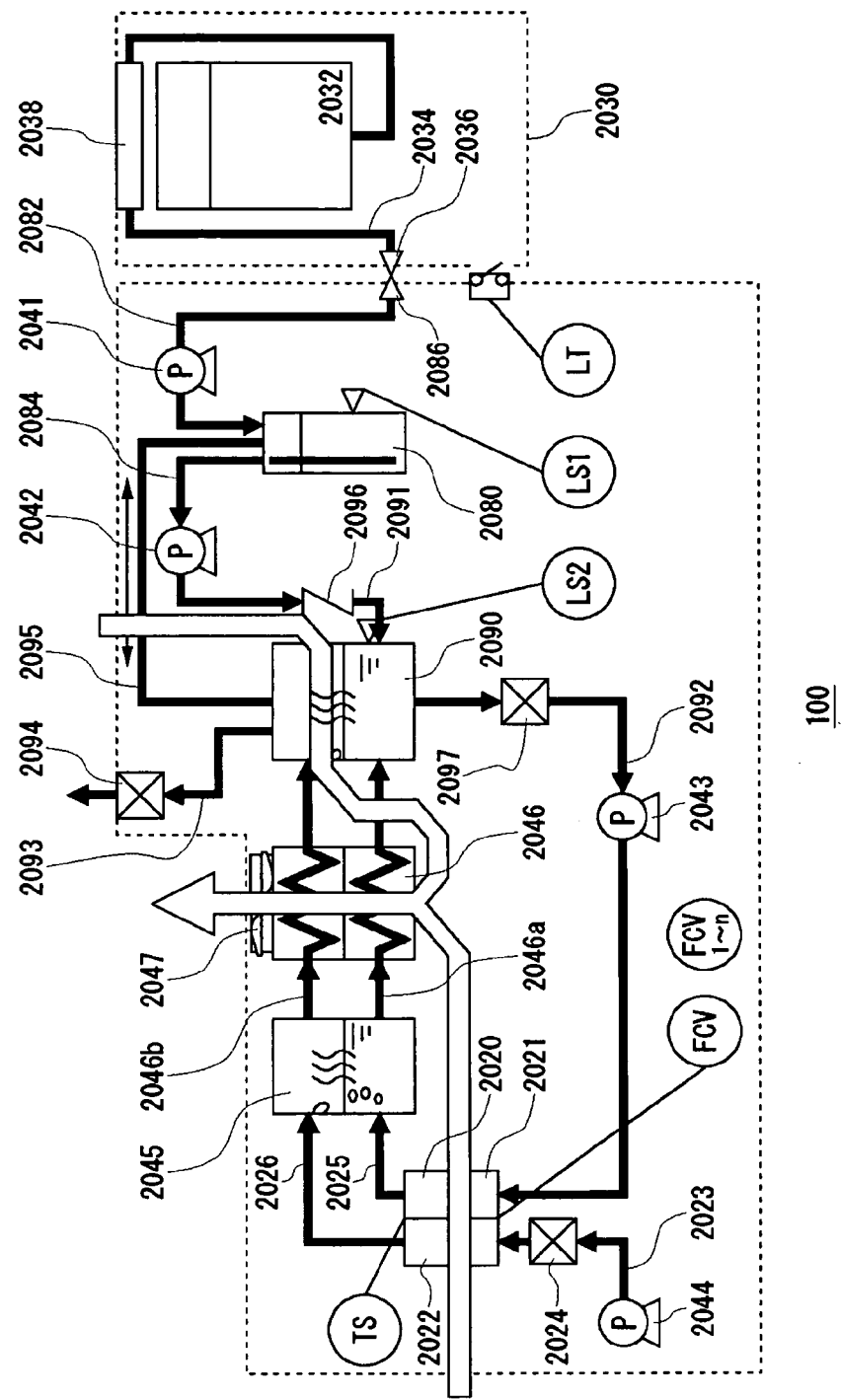
FIG. 15 schematically illustrates a structure of a power supply apparatus.

FIG. 14 is a perspective view of the power supply apparatus 100, and FIG. 15 illustrates a structure of the power supply apparatus 100. The power supply apparatus 100 uses methanol as a liquid fuel and generates electric power in a fuel cell by an electrochemical reaction induced between this methanol and air serving as an oxidant. This is a so-called direct methanol fuel cell (DMFC) system, and the overall dimension thereof is configured compactly so that it can be suitably used as a power supply for a portable notebook personal computer.

The power supply apparatus 100 is structured such that inside a casing 2010 as shown in FIG. 14 a stack of fuel cells 2020 is mounted on one side thereof in a longitudinal direction, a fuel cartridge 2030 connected detachably with the power supply apparatus 100 is mounted on the other side, and an auxiliary unit 2040 is mounted approximately in the center. A control unit and a secondary battery, both not shown in FIG. 14, are provided within a cradle 2050 on which a notebook personal computer is placed. This control unit also has the same processing function as that of the control unit 190 shown in FIG. 1. Though not shown in FIG. 14, the power supply apparatus 100 includes, by necessity, the charge-discharge unit, the voltage conversion unit, the ammeter and the voltmeter as shown in FIG. 1.

Adjacent to the fuel cartridge 2030 there are provided a fuel sub-tank 2080, which is a second fuel storage, and a buffer tank 2090, which is a third fuel storage. Pure methanol or high-concentration methanol water solution stored in a fuel bag (first fuel storage) 2032 within the fuel cartridge 2030 is introduced into the buffer tank 2090 via the fuel sub-tank 2080 and then diluted, by the buffer tank 2090, into a predetermined concentration of 1 mol/L. That is, the fuel sub-tank 2080 has functions of not only detecting that the fuel level in the fuel bag 2032 has reached the zero but also eliminating the air (gas components) mixed in with fuel supply passages 2034 and 2082 at the time when the fuel cartridge 2030 is mounted or removed. Also, the buffer tank 2090 has not only a function of adjusting the concentration of fuel but also a function of a vapor-liquid separator in which the gas components discharged from the fuel cell 2020 is discharged externally from said power supply apparatus 100 (the detail will be discussed later).

The auxiliary unit 2040 includes a methanol pump (first liquid pump) 2041 which supplies fuel from the fuel bag 2032 to the fuel sub-tank 2080, a methanol pump (second liquid pump) 2042 which supplies fuel from the buffer tank 2090 to the fuel cell 2020, a methanol pump (third liquid pump) 2043 which supplies fuel from the buffer tank 2090 to the fuel cell 2020, and an air pump 2044 which supplies oxygen (air in the present embodiment). This auxiliary unit 2040 is mounted between the fuel cell 2020 and the fuel storage comprised of the fuel cartridge 2030, the fuel sub-tank 2080 and the buffer tank 2090. This structure is implemented for the purpose of having minimum length of the fuel supply passages 2034, 2082, 2084, 2091 and 2092 to save the space and increase the space utilization efficiency and supplying promptly the high-concentration methanol supplied intermittently to the fuel cell 2020.

The auxiliary unit 2040 includes: a vapor-liquid separator 2045 which mixes an anode discharge (waste methanol+carbon dioxide) composed principally of the liquid discharged from an anode 2021 side of the fuel cell 2020 with a cathode discharge (exhaust air+generated water) composed principally of gas discharged from a cathode 2022 side thereof and separates the mixture into a gas component and a fluid component; and a cooler 2046 which distributes the gas component and the fluid component separated by the vapor-liquid separator 2045 through different pipings and cools the discharges of the fuel cell 2020 by a cooling fan 2047 that discharges the air inside the power supply apparatus 100. And the auxiliary unit 2040 including the vapor-liquid separator 2045 and the cooler 2046 is mounted between the fuel cell 2020 and the buffer tank 2090. In this manner, the vapor-liquid separator 2045 having a function of separating vapor and liquid is installed before the buffer tank 2090 (cooler 2046). Thus, the anode discharge and the cathode discharge in which liquid and gas are mixed are united and then the liquid component and the gas component are distributed respectively to a liquid component passage 2046a and a gas component passage 2046b so as to be cooled, so that the heat exchange efficiency can be improved as compared to when the fluid with the gas and the liquid mixed together is cooled.

The gas component out of the discharges of the fuel cell 2020 recovered by the buffer tank 2090 is released, outside the power supply apparatus 100, through a gas component exhaust passage 2093. In such a case, the gas component exhaust passage 2093 is provided as long as possible so that the gas component is not released outside, and it is preferred that an exhaust filter 2094 be provided at an exist. In view of possibility that the amount of generated water produced by the fuel cell 2020 is greater than the amount of water vapor discharged from the buffer tank 2090 and therefore the fuel (methanol water solution) circulating within the power supply apparatus 100 overflows, the buffer tank 2090 and the fuel sub-tank 2080 are connected with each other through a piping (tank communicating passage 2095) provided above them. When the buffer tank 2090 overflows, the fuel sub-tank 2080 plays a role of the buffering in the buffer tank 2090 and at the same time the fuel is supplied from the fuel cartridge 2030 to the fuel sub-tank 2080. And if the pressure in the fuel sub-tank 2080 rises temporarily, the buffer tank 2090 plays a role of allowing the pressure of the fuel sub-tank 2080 to escape. A check valve 2096 is provided between the fuel sub-tank 2080 and the buffer tank 2090, and it is so structured that the diluted methanol water solution does not flow backward from the fuel supply passage 2091 to the fuel supply passage 2084, namely from the buffer tank 2090 to the fuel sub-tank 2080, unless it overflows via the tank communication passage 2095. Cartridge joints 2036 and 2086 are provided between the fuel bag 2032 and the fuel sub-tank 2080, and the fuel supply passage 2034 and the fuel supply passage 2082 are connected to each other through these cartridge joints 2036 and 2086. In order that a safety mechanism for recovering the leakage of fuel, at the time of inserting or removing a cartridge, a locking mechanism for the joint or the like mechanism can be provided in a housing main body side, this joint part is such that the cartridge joint 2036 in the fuel cartridge 2030 side is a male whereas the cartridge joint 2086 in the fuel sub-tank 2080 side is a female. In this manner, the female structure allows the assembly of more complicated mechanisms and realizes a simple structure in the fuel cartridge 2030 side, thus achieving advantageous aspects in terms of the size and cost.

To detect the status of whether the fuel cartridge 2030 is being inserted or removed, a limiter LT is provided in the housing main body of the power supply apparatus 100 in contact with the fuel cartridge 2030. This structure allows detecting whether the fuel cartridge 2030 is normally fit into the power supply apparatus 100 or not, so as to make sure that the fuel is not leaked from the cartridge joints 2036 and 2086 while in use. The means for detecting whether the fuel cartridge 2030 is inserted or removed is not limited to the limiter LT, and a structure may be such that an IC chip or the like is embedded in a predetermined position of the fuel cartridge 2030 so as to detect the position of the IC chip and at the same time the information, on the fuel cartridge 2030, such as volume, concentration, fuel type and serial number is communicated between the control unit of the power supply apparatus 100 and the fuel cartridge 2030.

The fuel supply passage 2034 in the fuel cartridge 2030 has its inlet positioned in the bottom of the fuel bag 2032, and is so arranged as to move upwards along the side of wall within the fuel cartridge 2030 and is then connected with the cartridge joint 2036. A fuel confirmation window 2038 is set up in an upper part, namely part of upper hem, of the fuel cartridge 2030 so that the fuel supply passage 2034 is visible. It is desirable that transparent material such as Teflon (registered trademark) tube be used to form the fuel supply passage 2034 to confirm the interior of the fuel supply passage 2034 from this fuel confirmation window 2038. The fuel bag 2032 is a container such that the volume thereof can be varied and a small amount of gas such as air is presealed inside together with the fuel. Hence, when the remaining fuel stored in the fuel bag 2032 gets small, the boundary between liquid phase and gaseous phase can be visibly verified. The confirmation will be further facilitated if the fuel is colored beforehand.

The above flow of the fuel is summarized as follows. The high-concentration methanol or pure methanol in the fuel bag 2032 is distributed through the fuel supply passage 2034 so as to be supplied to the housing main body of the power supply apparatus 100. The fuel cartridge 2030 and the housing main body of the power supply apparatus 100 are connected with each other by way of the cartridge joints 2036 and 2086, and the high-concentration methanol in the fuel bag 2032 is supplied to the fuel sub-tank 2080 by the suction force of the methanol pump 2041 provided in the fuel supply passage 2082 which is connected from the cartridge joint 2086 to the fuel sub-tank 2080. If the gas is mixed in with the fuel supply passages 2034 and 2082 from the cartridge joints 2036 and 2086 at the time when the fuel cartridge 2030 is mounted or removed, such gas will be eliminated by this fuel sub-tank 2080. Hence, a structure is such that such gas as air bubbles is not mixed into a buffer tank 2090 side from the fuel sub-tank 2080.

It is to be noted here that an oxidant supply passage 2023 sends the air supplied from the air pump 2044 to an air filter 2024. The air filter 2024 removes organic matters in the air by catalytic combustion. Alternatively, the air filter 2024 absorbs cations. Through an anode exhaust passage 2025, the waste methanol and the carbon dioxide discharged from the anode 2021 side of the fuel cell 2020 are released to the vapor-liquid separator 2045. Through a cathode exhaust passage 2026, the exhaust air and the generated water discharged from the cathode side 2022 of the fuel cell 2020 are released to the vapor-liquid separator 2045. A fuel filter 2097 removes or absorbs impurities, such as contaminants and cations, mixed in with the methanol water solution supplied from the buffer tank 2090.

Figure 16:
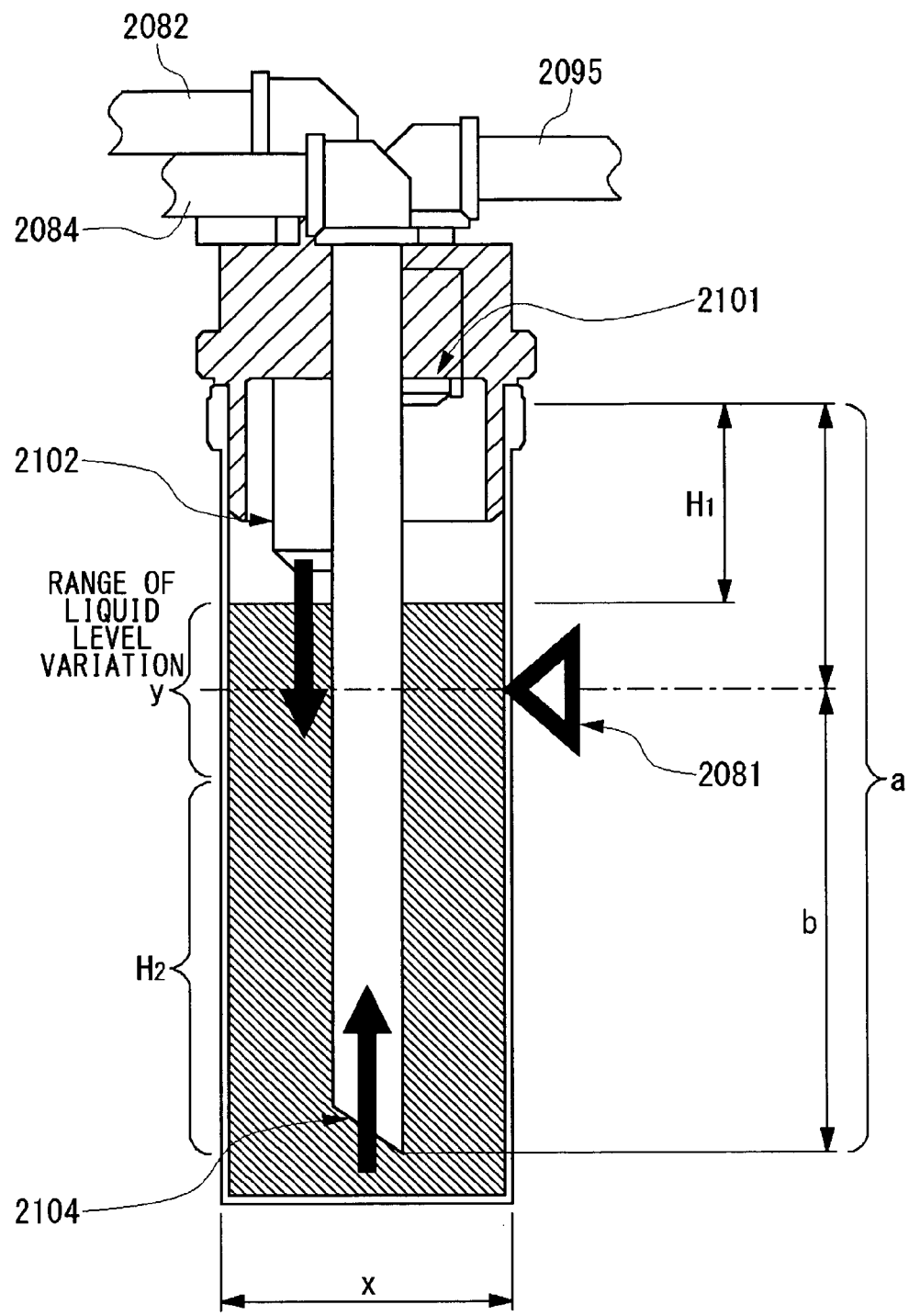
FIG. 16 illustrates in detail a structure of a sub-tank of a power supply apparatus.

As shown in FIG. 16, a liquid-level sensor 2081 that detects fuel runout is provided in the fuel sub-tank 2080 at height b where it is located ½ or more of the height a of the tank. A structure is such that when it is detected that the liquid level of fuel in the fuel sub-tank 2080 has reached the position of the liquid-level sensor 2081 or below, the methanol pump 2041 is driven and high-concentration fuel is added to the fuel sub-tank 2080 from the fuel bag 3202. If the liquid level of fuel in the fuel sub-tank 2080 is not recovered after the methanol pump 2041 has been driven for a predetermined period of time, an alarm will be displayed to a user indicating that the fuel has run out. If the fuel liquid level of the fuel sub-tank 2080 is not recovered even when the time for replacement set for the change of the fuel cartridge 2030 has passed after the alarm to the user indicating that the fuel has run out was issued, the system will cease to operate. It is necessary that this liquid-level sensor 2081 is provided in a position such that a sufficient amount of fuel to operate the system is still stored while the fuel cartridge 2030 is replaced anew. In the present embodiment, the time required for the cartridge replacement is set to approximately 5 minutes, and the amount of fuel needed to operate the system while the cartridge is replaced anew is about 5 cc. Also, in the present embodiment the liquid-level sensor 2081 is placed in a position where it is located at ½ or more of the height of the tank. The high concentration methanol in the fuel sub-tank 2080 is supplied to the buffer tank 2090 by the suction force of the methanol pump 2042 provided in the fuel supply passage 2084. The fuel supply passage 2084 is connected with the fuel supply passage 2091 by way of the check valve 2096, and a structure is such that, as a steady state, the diluted methanol water solution in the buffer tank 2090 side does not flow back into the fuel sub-tank 2080 from the check valve 2096.

In the sub-tank 2080, a gas intake/exhaust opening 2101 communicated with the tank communicating passage 2095 is provided on the top surface of a container, thus realizing a structure such that the gas inside the container can freely enter and exit. By employing this structure, the pressure inside the container does not get pressurized nor becomes negative-pressure even when the liquid level varies. As a result, the safety of the fuel sub-tank 2080 is raised. Also, abnormal operations where, for example, the liquid fuel flows back into the fuel supply passage 2082 and the liquid fuel flows into the fuel supply passage 2084 at the timing other than a predetermined timing can be prevented. Note that a fuel filler port 2102 is located at an end of the fuel supply passage 2082 and a fuel exhaust port 2104 is located at an end of the fuel supply passage 2084.

As shown in FIG. 15, the power supply apparatus 100 has a plurality of sensors. TS is a temperature sensor to detect the temperature abnormality found in the fuel cell 2020. FCV is a voltage detection means for detecting the voltage abnormality in the fuel cell 2020. LS1 is a liquid-level sensor to detect the position of the liquid level of the fuel sub-tank 2080. LS2 is a liquid-level sensor to detect the position of the liquid level of the buffer tank 2090. LT is a limiter to detect whether the fuel cartridge 2030 is normally inserted into the power supply apparatus 100 or not.

As described above, the power supply apparatus 100 can transmit information to the device connected thereto, by varying the voltage to be outputted. The power supply apparatus 100 may transmit the information on the fuel cell 2020 acquired by these sensors to the device. If the device is provided with a monitor, a condition of the fuel cell 2020 can be displayed on the monitor. Thus the user can promptly take necessary actions to correct the abnormality found in the fuel cell 2020.

The fuel cell may be a passive fuel cell. A description is given below of an example where the fuel cell is a passive fuel cell.

Figure 17:
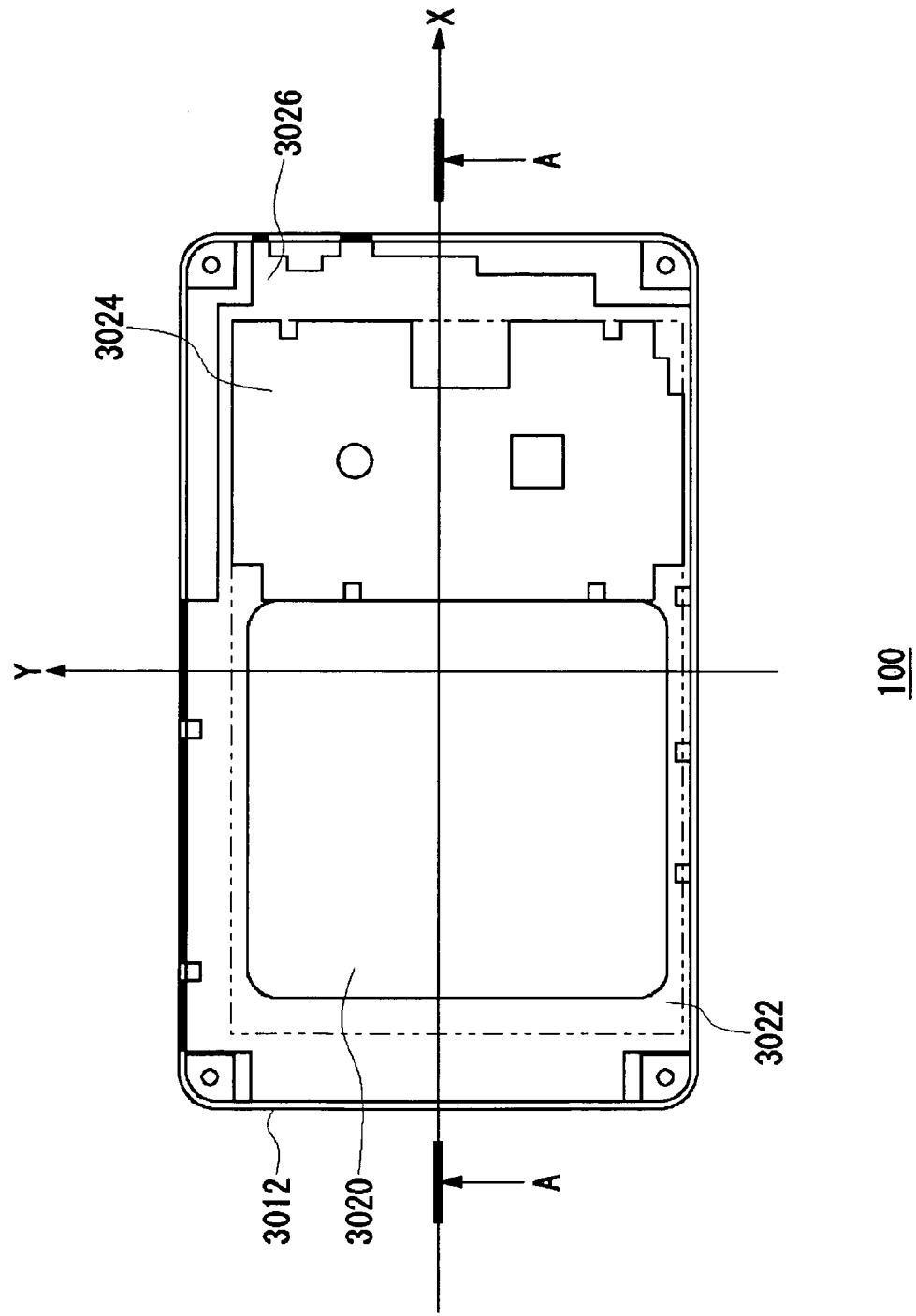
FIG. 17 is a top view showing an internal structure of a power supply apparatus when a fuel cell is a passive fuel cell.
Figure 18:
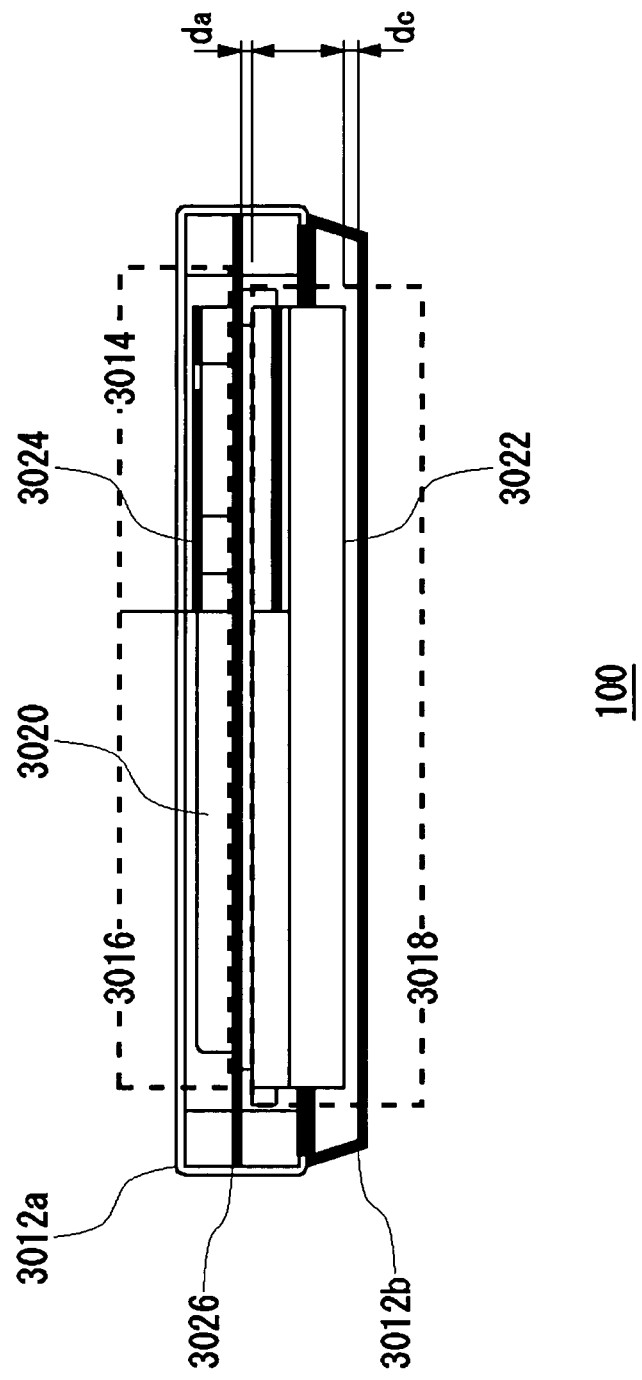
FIG. 18 is a cross-sectional view taken along a line A-A of FIG. 17.

FIG. 17 is a top view showing an internal structure of the power supply apparatus 100 according to an embodiment of the present invention. FIG. 18 is a cross-sectional view taken along a line A-A of FIG. 17. Using FIG. 18, a detailed description is given below of the power supply apparatus 100 according to an embodiment of the present invention. Three main units, which are a control unit 3014, a storage 3016 and a power generation unit 3018 are arranged within an housing 3012 composed of an upper housing 3012a and a lower housing 3012b. Though not shown in FIG. 18, the ammeter and the voltmeter shown in FIG. 1 are, by necessity, contained in the housing 3012.

The control unit 3014 in the power supply apparatus 100 performs operation control of the entire power supply apparatus 100 by, for example, selecting to store the power generated by the power generation unit 3018 in the storage 3016 or directly supply it to a not-shown external load. The control unit 3040 also includes a function of processing found in the control unit 190 shown in FIG. 1.

The storage 3016 in the power supply apparatus 100 is comprised of a secondary battery capable of charging and discharging. In the present embodiment, a lithium ion battery 3020 (hereinafter referred to as "LIB" also) is used as the storage 3016.

The power generation unit 3018 in the power supply apparatus 100 is comprised of a fuel cell 3022, which is a direct methanol fuel cell (hereinafter referred to as "DMFC" also) where methanol water solution or pure methanol (hereinafter referred to as "methanol fuel") is supplied to an not-shown anode.

(1) Internal Structure

A control board 3024, a LIB 3020 and a fuel cell 3022 in the control unit 3014 are fixed by a holder 3026 that holds them. The holder 3026 is fixed to an upper housing 3012a, so that each component and part of the control board 3024, the LIB 3020 and the fuel cell 3022 is fixed inside the housing 3012. When the power supply apparatus 100 is stably arranged, each component is arranged so that the control board 3024 and the LIB 3020 can be positioned above the holder 3026 and the fuel cell 3022 can be position below the holder 3026. Here, being stably arranged (stable arrangement) means as follows. Suppose that there are support legs 3168 as shown in FIG. 20D. And when the power supply apparatus 100 is placed on a horizontal or approximately horizontal (±10°) table or the like, the power supply apparatus 100 is placed so that these support legs come in contact with the table. This state is called the stable arrangement. If there is no support legs, the bottom surface will have a relatively large area, thus making difficult to fall when vibrated. Also, the bottom surface has no interface such as buttons or display unit thereon, so that the bottom surface is smoothly in contact with the table. This state is also called the stable arrangement.

The control board 3024 is placed in an upper side of the power supply apparatus 100. This is because it is easier for the user of the power supply apparatus 100 to use it if the user interface is positioned in the upper side thereof and because the wiring space can be made smaller if the control board 3024 is placed closer to the user interface. The larger electrode area of the fuel cell 3022 is desired because the larger electrode area can contribute to the higher power generation capacity. Normally, the fuel cell 3022 is so operated as to generate a constant electric power. However, the fuel cell 3022 can properly deal with a case when a large amount of power is requested by a load. Also, even when the amount of power requested by the load is small as compared with the power generation capacity of the fuel cell 3022, the fuel cell 3022 can generate the power stably. Thus, the deterioration of the fuel cell 3022 caused by the overload can be prevented. As a result, it is preferable that the fuel cell 3022 be placed on a position where as large an electrode area as possible can be obtained in the housing 3012. Thus, in the power supply apparatus 100, the control board 3024 is placed in the upper side of the housing 3012 and consequently the fuel cell 3022 is placed in the lower side thereof.

Figure 19A:
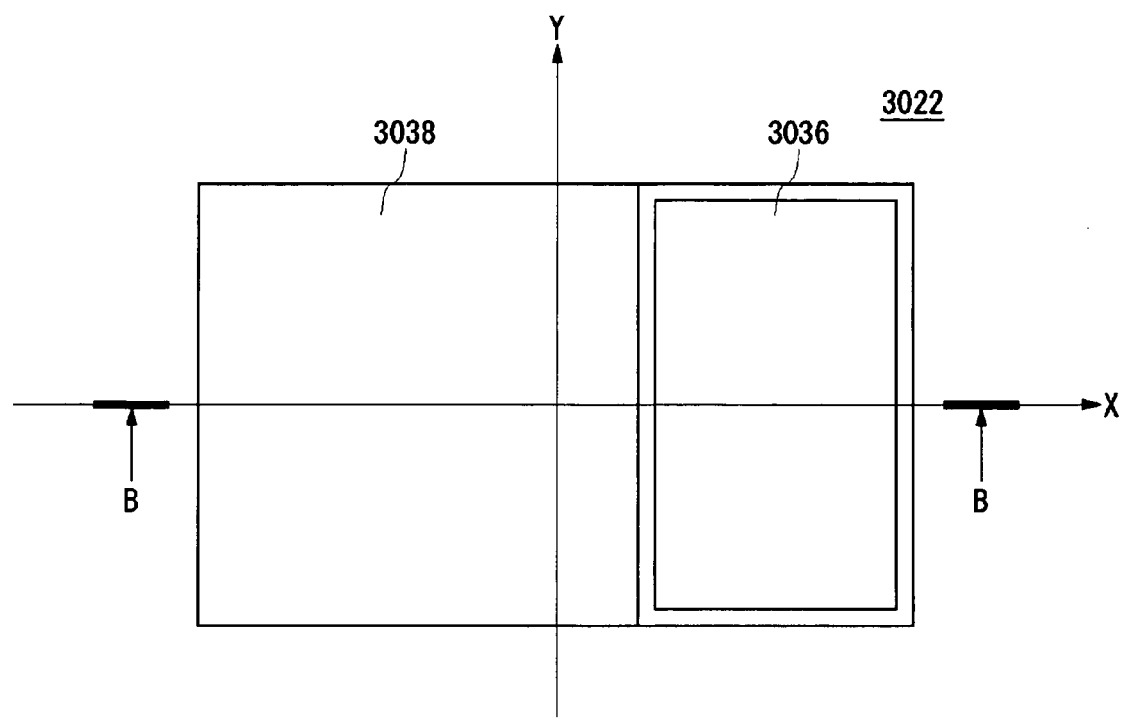
FIG. 19A is a top view showing a structure of a power supply apparatus shown in FIG. 17.
Figure 19B:
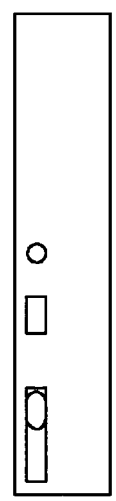
FIG. 19B is a right side view thereof.
Figure 19C:
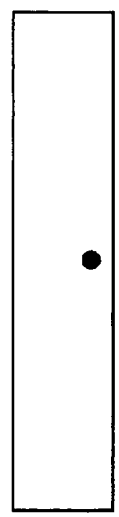
FIG. 19C is a left side view thereof.
Figure 19D:
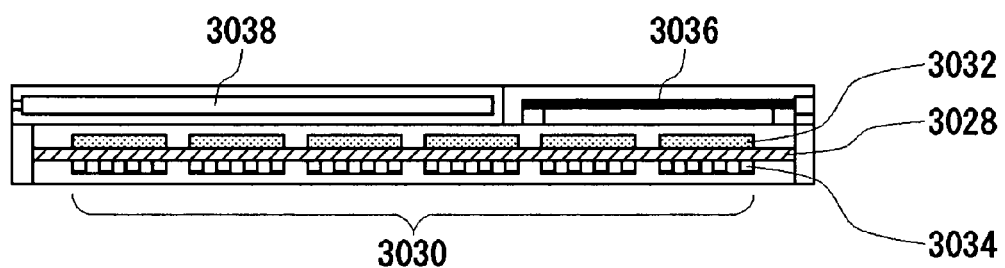
FIG. 19D is a cross-sectional view taken along a line B-B.

FIGS. 19A to 19D illustrate concrete structures of the fuel cell 3022. FIG. 19A is a top view of the fuel cell 3022; FIG. 19B is a right side view thereof; FIG. 19C is a left side view thereof; and FIG. 19D is a cross-sectional view taken along a line B-B. The fuel cell 3022 used for the power supply apparatus 100 is a fuel cell module 3030 where a plurality of pairs of electrodes are provided in a single electrolyte membrane 3028 and are connected in series. Here, the fuel cell 3022 is called a flat module. A methanol fuel, which is liquid, is supplied to an anode 3032 of the fuel cell 3022 and, as a result, carbon dioxide (gas) is generated as reaction products. Hence, the anode 3032 is provided in an upper surface of the electrolyte membrane 3028 in order that the supply of the fuel and the emission of the products can be smoothly done using the gravity when stable arrangement is provided. On the other hand, air is supplied to a cathode 3034 as oxidant and, as a result, water is generated as reaction products. At this time, 1.5× oxygen molecules are required for each methanol molecule. Thus it is preferable that a gap (space) in a cathode 3034 side of the fuel cell 3022, namely a gap dc between the fuel cell 3022 and the housing 3012b be larger than a gap (space) in an anode 3032 side of the fuel cell 3022, namely a gap da between the fuel cell 3022 and the holder 3026. More specifically, it is preferable that the range thereof be set such that $10da \geq dc > da$.

A direct operation instruction as to whether the fuel cell 3022 is to be operated (generated) or not, more specifically, whether the fuel cell 3022 is to be connected to the load or not is given by a fuel cell control unit 3036. In consideration of a wiring space, the fuel cell control unit 3036 is also arranged in a neighborhood of the control unit 3014 of the power supply apparatus 100. In the case of fuel cell 3022 according to the embodiment, the fuel cell control unit 3036 is arranged directly underneath the control unit 3014 and above the fuel cell module 3030. A fuel tank 3038 is provided in a space, above the fuel cell module 3030, where no fuel cell control unit 3036 lies. In this manner, the space is effectively utilized and the thermal conduction, by the fuel tank 3038, spreading from the fuel cell module 3030 toward the control board 3024 or LIB 3020 is shielded. Further, the gap da is provided between the fuel cell 3022 and the holder 3026, and a space is provided between the holder 3026 and the control board 3024. Also, the LIB 3020 is placed above the fuel tank 3038 which is less likely to transfer the heat, and the holder 3026 is fixed to the upper housing 3012a over the appropriately entire circumference except for the space provided for the wiring. By implementing this structure, the portion above and the portion below the holder 3026 are thermally separated from each other.

As evident from FIG. 17 and FIG. 19, the power supply apparatus 100 and the fuel cell 3022 are arranged approximately symmetrical about an X axis, whereas the internal structures thereof are asymmetrical with respect to a Y axis. The reasons for this asymmetrical structure are as follows. If the internal structures thereof are arranged asymmetrical in the longitudinal direction, the temperature difference will be more likely to occur within the housing 3012. The convection flow caused by this temperature gradient makes it easy for the air to enter and exit through ventilating holes 3166 provided in the lower housing 3012*b*.

(2) External Structure

Next, a description is given of an external structure of the power supply apparatus 100 having the internal structures described as above.

Figure 20A:
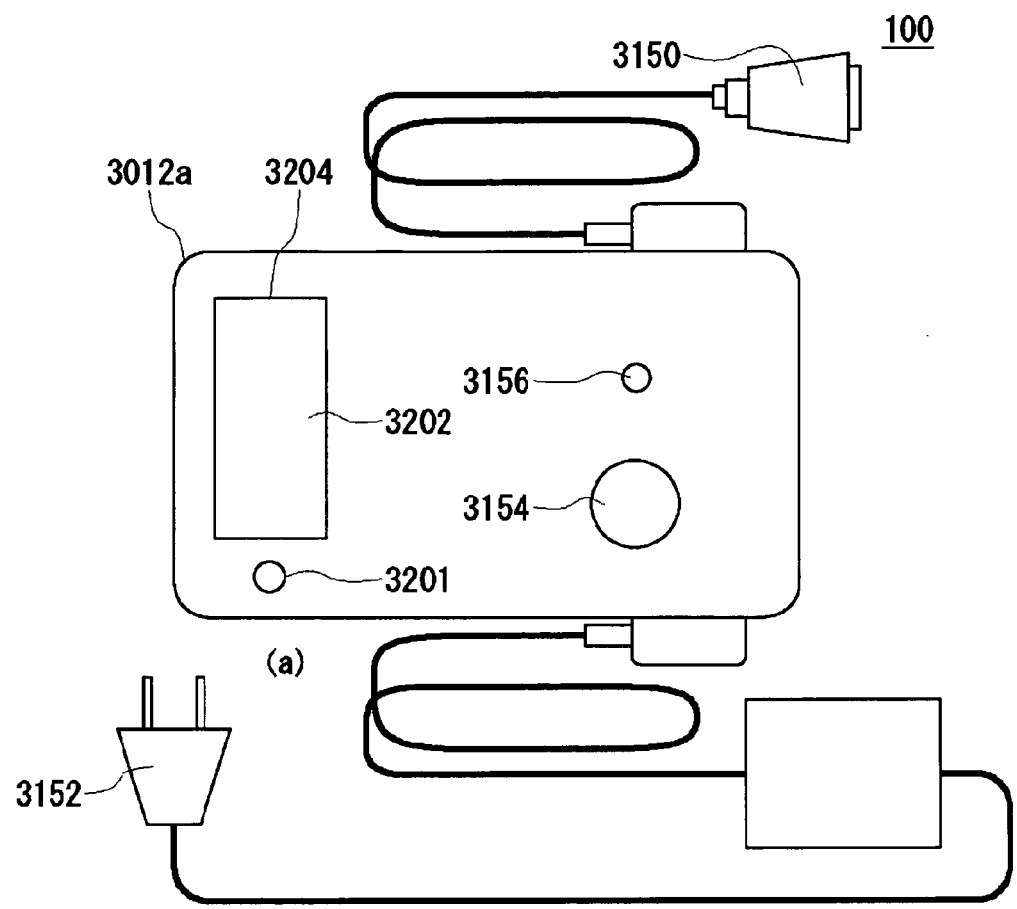
FIG. 20A is a top view showing an external appearance of a power supply apparatus shown in FIG. 17.
Figure 20B:
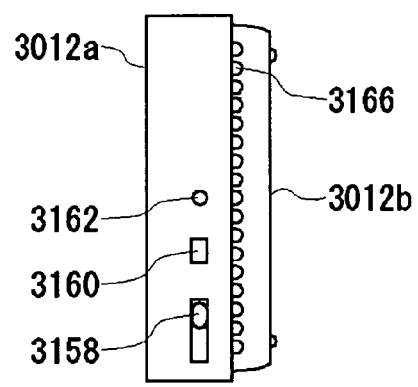
FIG. 20B is a right side view thereof.
Figure 20C:
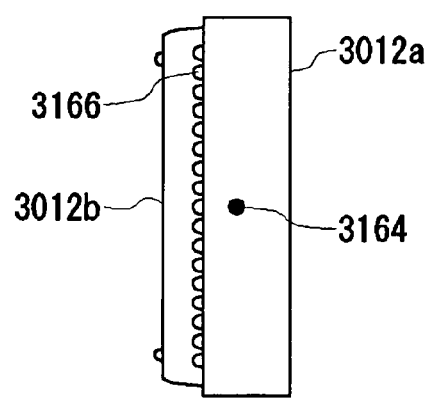
FIG. 20C is a left side view thereof.
Figure 20D:
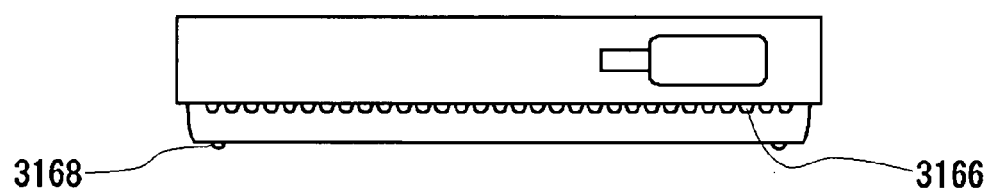
FIG. 20D is a front elevational view.

FIGS. 20A to 20D illustrate external appearances of the power supply apparatus 100. FIG. 20A is a top view showing an external appearance of the power supply apparatus 100; FIG. 20B is a right side view thereof; FIG. 20C is a left side view thereof; and FIG. 20D is a front elevational view thereof. The power supply apparatus 100 is provided with a feed connector 3150, on one side surface of the power supply apparatus 100, which supplies power to an external load and a power receiving connector 3152, on the other side surface thereof, which receives power from the commercial power source. A check button 3154 is a button used to check the state of the power supply apparatus 100. When the check button 3154 is pressed down and a display unit (LED) 3156 lights up, this indicates that the power supply apparatus 100 can supply the power to the external load. When the check button 3154 is pressed down and the LED 3156 blinks or does not light up at all, this indicates that the remaining amount of the LIB 3020 is small and therefore the recharging is recommended. Further, this indicates that it is not possible to supply the power to the external load. In this manner, depressing the check button 3154 enables to check the state of the power supply apparatus 100.

A main power supply switch 3158 on the right side surface is a slide switch inserted between the fuel cell module 3030 and the fuel cell control unit 3036, and is a switch which connects the fuel cell module 3030 electrically to the load. A start switch 3160 is a push switch that starts the fuel cell 3022. When this start switch 3160 is pressed down, the fuel cell 3022 starts generating the electric power and the LED 3162 lights up. That is, when the start switch is depressed and the LED 3162 lights up, this indicates a state where the fuel cell 3022 can generate the power. When the voltage of the LIB 3020 is below a predetermined voltage, this indicates a state where the recharging is to take place. When the LED 3162 does not light up, this indicates a state where the fuel of the fuel cell 3022 has been depleted and therefore the fuel tank 3038 needs to be refilled with the methanol fuel.

As described above, when the LED 3162 does not light up, the methanol fuel needs to be supplemented. On the left side surface, a fuel refill hole 3164 is provided to supplement the methanol fuel. This fuel refill hole 3164 is communicated with the fuel tank 3038 provided inside, so that the methanol fuel can be supplied to the fuel tank 3038 through the fuel refill hole 3164 using a fuel refill means like a syringe. Though the top side surface and the lower side surface are not shown, the ventilating holes 3166 are provided on the four faces of the lower housing 3012*b*. Through the ventilating holes 3166, the air flows in from the outside of the power supply apparatus 100, and the carbon dioxide or water flows out from within. The support legs 3168 are provided on the bottom surface of the lower housing 3012*b*. When the power supply apparatus 100 is stably placed on a board like a desk, a space is created between the bottom surface of the lower housing 3012*b* and the desk. As a result, a structure is achieved where the air flowing through this space removes heat from the fuel cell 3022. Further, an illuminance sensor 3201, a touch panel 3202 and a display are provided.

(3) Control Circuit

Figure 21:
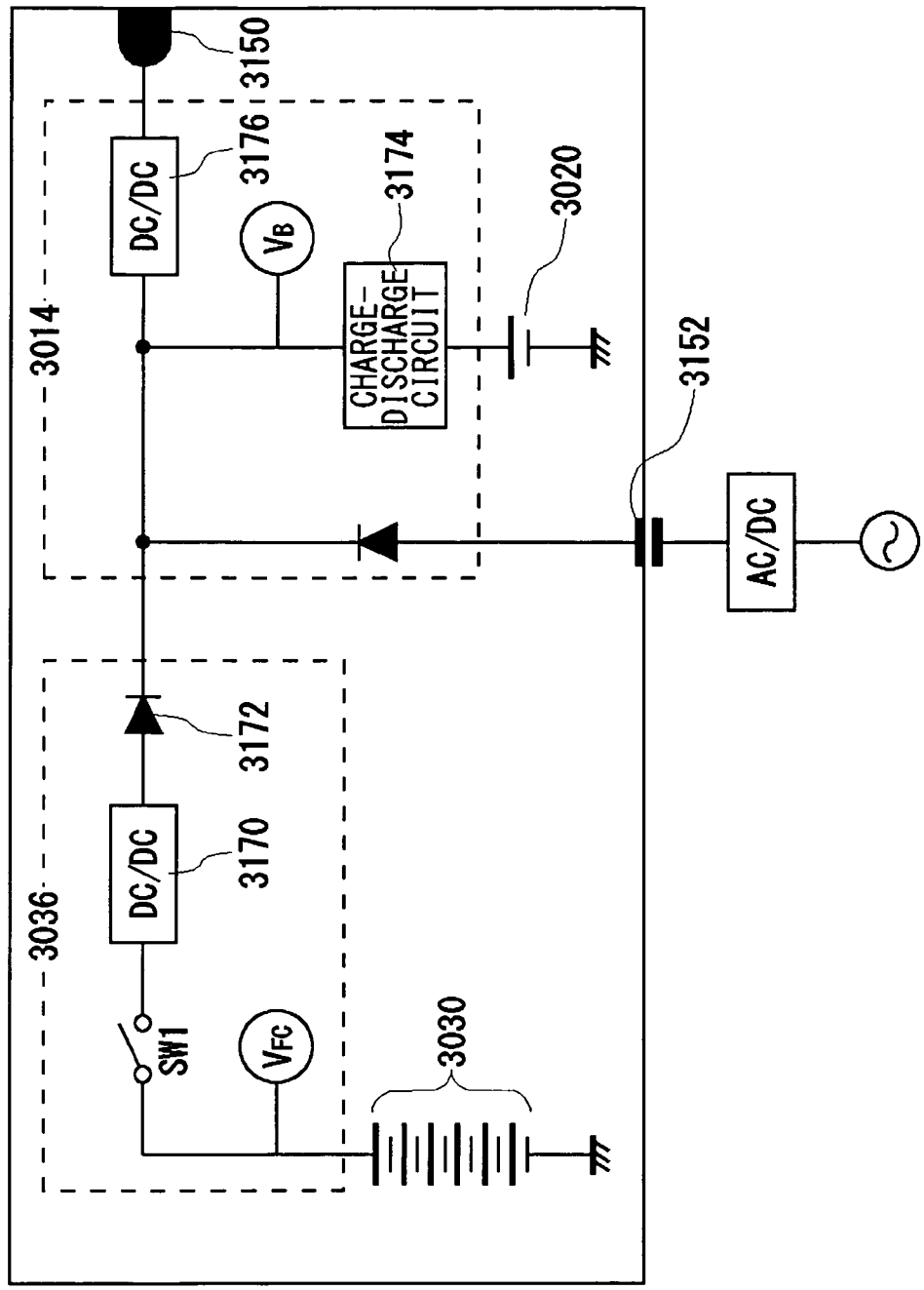
FIG. 21 illustrates a circuit configuration of a power supply system shown in FIG. 17.

A description is now given of a circuit configuration that realizes the above operation. FIG. 21 illustrates a circuit configuration of the power supply apparatus 100 according to the present embodiment. A SW1 is switch mechanism, coupled to the main power supply switch 3158, which connects the fuel cell module 3030 to a DC-DC converter 3170. Depressing the start switch 3160 starts the operation of the DC-DC converter 3170. When the switch mechanism SW1 is closed (turned on) and thus the fuel cell control unit 3036 including the DC-DC converter 3170 is connected to the fuel cell module 3030, the fuel cell control unit 3036 detects the total voltage $V_{FC}$ of the fuel cell module 3030 and determines from the detected value of $V_{FC}$ whether the methanol fuel is filled or the fuel is in a depletion state. That is, if the fuel is depleted, $V_{FC}$ will drop. Thus, a lower limit threshold value is preset; and if the detected $V_{FC}$ is above the lower limit threshold value, the LED 3162 will light up with the start switch 3160 depressed. If, on the other hand, the detected $V_{FC}$ has fallen below the lower limit threshold value, the LED 3162 will not light up with the start switch 3160 depressed.

The fuel cell module 3030 is connected to the LIB 3020 by way of the switch mechanism SW1, the DC-DC converter 3170, a rectifying device (diode) 3172 and a charge-discharge circuit 3174 which serves as the charge-discharge unit in the preferred embodiment of the present invention. At the same time, the fuel cell module 3030 is connected to an external load via the DC-DC converter 3176. The DC-DC converter 3176 can vary the voltage, based on an instruction from the control unit 3014. When a voltage $V_B$ of the LIB 3020 is lower than a setting voltage V1 and the external load is connected, the charge-discharge circuit 3174 supplies the power generated by the fuel cell 3022 to the external load. When the voltage $V_B$ of the LIB 3020 is lower than the setting voltage V1 and the external load is not connected, the charge-discharge circuit 3174 supplies the power generated by the fuel cell 3022 to the LIB 3020 to recharge it. When the voltage $V_B$ becomes higher than an upper limit voltage V2 after the LIB 3020 has been recharged or when the voltage $V_B$ of the LIB 3020 is higher than or equal to the setting voltage V1 with the external load connected, this indicates a state where the fuel cell 3022 can supply the power. However, this is a standby state where the power is not supplied from the fuel cell 3022 to the LIB 3020 or external load.

The voltage $V_B$ is also linked to the check button 3154 and the LED 3156. Thus, when the check button 3154 is pressed down and the voltage $V_B$ is higher than or equal to V1, the LED 3156 lights up. When the voltage $V_B$ is lower than V1 and is higher than or equal to a lower limit voltage V3, the LED 3156 blinks. When the voltage $V_B$ is lower than V3, the LED 3156 does not light up. In the present embodiment, the power receiving connector 3152 is provided so that the LIB 3020 can be recharged from the commercial power source. Thus, a cable with an AC adapter (AC-DC converter) for recharging a mobile phones can be connected. The user convenience is high if the main power supply switch 3158 (switch mechanism SW1) is constantly turned on. With the switch always turned on, the power can be supplied from the fuel cell 3022 at the voltage $V_B$ whenever necessary. However, if the state continues for a long period of time where the reaction for power generation cannot be developed with the power capable of being supplied (the fuel cell 3022 being connected to the load), this may account for the deterioration of electrolyte membranes. Thus it is desirable that the main power supply switch 3158 is turned off (SW1 is open) if the LIB 3020 is sufficiently recharged. Further, it is desirable that the ventilating holes 3166 (air openings) are also closed then.

The present invention is not limited to the above-described embodiments only, and it is understood by those skilled in the art that various modifications such as changes in design may be made based on their knowledge, the embodiments may be combined in various ways and the embodiments added with such modifications are also within the scope of the present invention.

While the preferred embodiments of the present invention have been described using specific terms, such description is for illustrative purposes only, and it is to be understood that changes and variations may be further made without departing from the spirit or scope of the appended claims.

What is claimed is:

1. A power supply apparatus for supplying power to a device connected thereto, the apparatus comprising:
a power supply;
a voltage conversion unit which varies a voltage inputted from said power supply to output to the device a varied voltage which is an output voltage of said power supply apparatus;
an ammeter which measures an output current value of said power supply apparatus; and
a control unit which controls said voltage conversion unit to vary the output voltage of said power supply apparatus, wherein
said control unit controls the voltage conversion unit to discretely increase the output voltage of said power supply apparatus, and monitors the output current value to detect that the output voltage of said power supply apparatus has reached a voltage capable of driving the device,
after detecting that the output voltage has reached the voltage capable of driving the device, said control unit controls said voltage conversion unit to continuously decrease the output voltage of said power supply apparatus, and monitors the output current value to detect a lower limit voltage capable of driving the device, and
said control unit controls the voltage conversion unit to transmit information on said power supply apparatus to the device by periodically varying, based on a function readable by the device and associating a conversion cycle of the output voltage with the information on the power supply apparatus, the output voltage of said power supply apparatus between the voltage capable of driving the device and the lower limit voltage capable of driving the device so as to convert the information on the power supply apparatus into the conversion cycle, and by transmitting the conversion cycle to the device so that the device reads the information from the output voltage varying in accordance with the function.

2. A power supply apparatus according to claim 1, further comprising:
a secondary battery;
a charge-discharge unit which outputs electric power from said secondary battery or charges said secondary battery by use of electric power of said power supply; and
a voltmeter which measures an input voltage value to said voltage conversion unit from said secondary battery,
wherein said control unit compares the input voltage value with a predetermined voltage value,
wherein when the input voltage value is less than the predetermined voltage value, it is determined that an output power value of said power supply apparatus is insufficient to satisfy a power required by the device, and
wherein when the input voltage value is greater than the predetermined voltage value, it is determined that the output power value of said power supply apparatus is sufficient to satisfy the power required by the device, and the said secondary battery is charged by the electric power of said power supply by controlling said charge-discharge unit.

3. A power supply apparatus according to claim 2, further comprising a second voltmeter which measures an output voltage value of said power supply apparatus,
wherein said control unit compares the input voltage value in said second voltmeter with a predetermined voltage value; and
when a transition is made from a state where the input voltage value is above the predetermined voltage value to a state where the input voltage value is below the predetermined value, said control unit calculates an output power value of said power supply apparatus by referring to the then output current value of said ammeter and the then output voltage value of said second voltmeter.

4. A power supply apparatus according to claim 2, further comprising:
a second ammeter which measures an output current value of said secondary battery; and
a second voltmeter which measures an output voltage value of said power supply apparatus,
wherein said control unit compares the output current value in said second ammeter with a predetermined current value; and
when a transition is made from a state where the output current value is below the predetermined current value to a state where the output current value is above the predetermined value, said control unit calculates the output voltage of said power supply apparatus by referring to the then output current value of said ammeter and the then output voltage value of said second voltmeter.

5. A power supply apparatus according to claim 3, wherein said control unit transmits the calculated output power value to the device in a manner such that the calculated output power is converted into a value of cycle, by which to vary the output voltage, by use of a predetermined function and the output voltage of said power supply apparatus is varied by using the value of cycle.

6. A power supply apparatus according to claim 4, wherein said control unit transmits the calculated output power value to the device in a manner such that the calculated output power is converted into a value of cycle, with which to vary the output voltage, by use of a predetermined function and the output voltage of said power supply apparatus is varied by using the value of cycle.

7. A power supply apparatus according to claim 1, wherein said power supply is a fuel cell.

* * * * *